US012707031B2

(12) United States Patent
Melamed et al.

(10) Patent No.: US 12,707,031 B2
(45) **Date of Patent: *Aug. 11, 2026**

(54) PATCH CORRECTION FOR LIGHT STEERING PROJECTOR

(71) Applicant: Barco Visual Solutions, Inc., Vancouver (CA)

(72) Inventors: Samuel Melamed, Vancouver (CA); Martin Gregory Beckett, Vancouver (CA); Raveen Kumaran, Vancouver (CA); Weicheng Yan, Beijing (CN)

(73) Assignee: Barco Visual Solutions, Inc., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/957,939

(22) Filed: Nov. 25, 2024

(65) Prior Publication Data

US 2025/0159115 A1 May 15, 2025

Related U.S. Application Data

(63) Continuation of application No. 18/365,173, filed on Aug. 3, 2023, now Pat. No. 12,192,684, which is a continuation of application No. PCT/CA2022/050219, filed on Feb. 15, 2022.

(60) Provisional application No. 63/150,005, filed on Feb. 16, 2021.

(51) Int. Cl.
*H04N 9/31* (2006.01)

(52) U.S. Cl.
CPC ........... *H04N 9/312* (2013.01); *H04N 9/3138* (2013.01); *H04N 9/3152* (2013.01); *H04N 9/317* (2013.01); *H04N 9/3185* (2013.01)

(58) Field of Classification Search
CPC .... H04N 9/312; H04N 9/3138; H04N 9/3152; H04N 9/317; H04N 9/3185
See application file for complete search history.

(56) References Cited

U.S. PATENT DOCUMENTS

| | | | | |
|---|---|---|---|---|
| 5,649,753 | A | 7/1997 | Masumoto | |
| 7,163,296 | B2 | 1/2007 | Sakai | |
| 10,469,808 | B2 * | 11/2019 | Damberg | H04N 9/312 |
| 2012/0008181 | A1 * | 1/2012 | Cable | G03H 1/2294 359/9 |
| 2017/0085846 | A1 * | 3/2017 | Damberg | H04N 9/3167 |
| 2017/0127025 | A1 | 5/2017 | Damberg et al. | |

(Continued)

FOREIGN PATENT DOCUMENTS

| | | | |
|---|---|---|---|
| CA | 3099611 | A1 | 11/2019 |
| WO | 2015017236 | A1 | 2/2015 |

(Continued)

*Primary Examiner* — Ariel A Balaoing
(74) *Attorney, Agent, or Firm* — Todd A. Rattray; Oyen Wiggs Green & Mutala LLP

(57) ABSTRACT

Example embodiments provide systems and methods for correcting non-uniformities of a light beam generated by a multi-emitter light source. In some embodiments a phase modulator displays patch lenses to correct for the non-uniformities. In some embodiments each region of the phase modulator is illuminated by a beam generated by one emitter of the multi-emitter light source. Such region of the phase modulator may display a patch lens for correcting non-uniformities in the corresponding beam which illuminates the region.

22 Claims, 19 Drawing Sheets

(56) References Cited

U.S. PATENT DOCUMENTS

| | | | | |
|---|---|---|---|---|
| 2017/0138545 | A1* | 5/2017 | Minor | F21K 9/61 |
| 2018/0048873 | A1* | 2/2018 | Damberg | H04N 9/3167 |
| 2020/0021786 | A1 | 1/2020 | Watanabe et al. | |
| 2020/0137362 | A1* | 4/2020 | Damberg | G02B 27/48 |

FOREIGN PATENT DOCUMENTS

| | | | |
|---|---|---|---|
| WO | 2015054797 | A1 | 4/2015 |
| WO | 2016015163 | A1 | 2/2016 |
| WO | 2016023133 | A1 | 2/2016 |
| WO | 2017059537 | A1 | 4/2017 |
| WO | 20190215202 | A1 | 11/2019 |

* cited by examiner 17
16
16
16
47
45
44
44C
48
θ

17
16
16
16
47
44
48
44C
52

PATCH CORRECTION FOR LIGHT STEERING PROJECTOR

CROSS-REFERENCE TO RELATED APPLICATIONS

This application is a continuation of U.S. patent application Ser. No. 18/365,173 having a filing date of 3 Aug. 2023 which is in turn a continuation of Patent Cooperation Treaty (PCT) application No. PCT/CA2022/050219 having an international filing date of 15 Feb. 2022, which in turn claims priority from, and for purposes of the United States of America the benefit under 35 U.S.C. § 119 of U.S. application No. 63/150,005 filed 16 Feb. 2021. All of the applications referred to in this paragraph are hereby incorporated herein by reference.

FIELD

The invention relates to correcting non-uniformities in light beams. One example application of the invention is in the field of light projection. For example, to illuminate a projector imager.

BACKGROUND

Projector systems modulate beams of light to generate desired images. Non-uniform beams of light may cause unwanted artifacts such as blurriness, streaks, speckle, etc. being present in the final images produced by a projector system.

Projector systems can require large amounts of light, for example to provide suitably bright images on large projection screens. Some projectors include single very high intensity light sources together with beam conditioning optics which collect light from the light source and deliver a uniform beam of light to an imager. Such light sources can be undesirably expensive. Solid state light sources such as solid state lasers and high intensity light emitting diodes are now available. However, in many applications plural solid state light sources are required to provide enough light. This raises the problem of how to cost effectively combine the light from different light sources to illuminate an imager in a suitable manner.

Various manufacturers make relatively inexpensive modules that combine several solid state light sources in a single unit. However, in many cases beams of light emitted from the different light sources differ and/or are not precisely aligned. For example, the light sources may not be evenly spaced apart, light beams from different light sources may be emitted in different directions, light beams emitted by different light sources may diverge differently, light beams from different light sources may have varying degrees of non-uniformity, etc. This makes such modules unsuitable for use in some projector systems.

There is a general desire for improved projector systems.

SUMMARY

This invention has many aspects. These include:

- methods and apparatus for projecting light;
- cinema projectors;
- consumer projectors;
- systems and methods for correcting non-uniformities in light beams generated by multi-emitter light sources;
- systems and methods for aligning optical elements of projector systems;

- systems and methods for combining different wavelengths of light into images;
- systems and methods for homogenizing light.

One aspect of the invention provides a projection system. The projection system may comprise one or more light sources operable to emit a plurality of light beams. The projection system may also comprise a phase modulator comprising a two-dimensional array of pixels. The pixels may be controllable to retard phase of light incident on the pixels by variable amounts. The phase modulator may have an active area in an optical path of the plurality of light beams. Each of the plurality of light beams may be incident on the active area of the phase modulator in a corresponding one of a plurality of distinct regions of the active area of the phase modulator. The projection system may also comprise a controller configured to set the pixels of each of the distinct regions of the phase modulator to display an optical form for a patch lens corresponding to the distinct region the patch lens is configured to correct for non-uniformities present in the corresponding one of the beams of light.

In some embodiments the distinct regions are arranged in an array comprising a plurality of rows and a plurality of columns.

In some embodiments the light source comprises a multi-emitter light source comprising at least two rows and two columns of light emitters.

In some embodiments the controller is configured to set the pixels of each of the distinct regions of the phase modulator to display a light steering phase pattern combined with the optical form for the corresponding patch lens.

In some embodiments the optical form for the patch lens corresponding to the distinct region is at least partially based on measured deviations from ideal of the corresponding light beam.

In some embodiments the optical form for the patch lens corresponding to the distinct region is at least partially based on measured deviations from ideal of a light field produced at an image plane after the corresponding light beam has interacted with the phase modulator.

In some embodiments the corrected non-uniformities comprise at least one of pointing parallelism, collimation and intensity distribution.

In some embodiments the displayed optical forms correspond to optical forms for spherical lenses.

In some embodiments adjacent patch lenses abut one another.

In some embodiments an entire active area of the two-dimensional array of pixels of the phase modulator is covered by patch lenses.

In some embodiments the optical form of each patch lens is generated independently.

In some embodiments the optical form of each patch lens is generated by the controller configured to execute an optimization process.

In some embodiments the optimization process comprises iteratively varying phase shifts of the pixels of the corresponding patch lens until one or more observed characteristics of a corresponding output beam indicate that the patch lens is suitably correcting for deviations from ideal of the light beam.

In some embodiments the optimization process is executed sequentially for different ones of the plurality of patch lenses.

In some embodiments the optimization process is executed in parallel for different ones of the plurality of patch lenses.

In some embodiments the optimization process comprises performing simulated annealing to find phase shifts for the pixels in the region which will make up the phase pattern for the corresponding patch lens.

In some embodiments the optical form for each of the patch lenses specifies at least one of focal length, optical centre shift, parameterized astigmatism and tilt of the corresponding patch lens.

In some embodiments at least one of the distinct regions is divided into a plurality of sub regions and the controller is configured to set the pixels of each of the sub regions to display an optical form corresponding to the sub region.

In some embodiments different parts of a single light beam illuminate two or more sub regions of a corresponding distinct region of the phase modulator.

In some embodiments at least one of the optical forms corresponds to a plurality of lenses superposed on one another.

In some embodiments at least one of the light beams extends over a plurality of the distinct regions.

In some embodiments one or more of the optical forms is respectively varied in real time to account for varying characteristics of a corresponding one of the light beams.

In some embodiments the optical form applied to each of the light beams further comprises a light steering component to steer light.

In some embodiments the corresponding patch lens and the corresponding light steering component are superposed.

In some embodiments the light steering components applied to different ones of the light beams are the same.

In some embodiments the light steering components applied to different light beams are different.

In some embodiments the light steering components are configured to steer the light beams to converge at a plurality of different points.

In some embodiments the controller controls each of the distinct regions of the phase modulator individually to display a pattern of phase shifts which steers light from the corresponding light beam.

In some embodiments the optical forms of each of the patch lenses and the corresponding light steering component are calculated independently of each other.

In some embodiments the optical forms of each of the patch lenses and the corresponding light steering component are calculated together.

In some embodiments the projector comprises receiving optics upstream from the phase modulator. The receiving optics may be configured to shape or modify the light beams to better illuminate the phase modulator.

In some embodiments the receiving optics shape light from the light beams for the light to match a size of the two-dimensional array of pixels.

In some embodiments the controller is configured to set at least a portion of the pixels of the phase modulator to display phase patterns selected to cause specular reflection of at least a portion of the light beams.

In some embodiments the controller is configured to dynamically vary the number of pixels in the portion of pixels to adjust a ratio of unsteered light to steered light.

In some embodiments the controller is configured to determine a desired ratio of unsteered light to steered light based at least in part on processing image data.

In some embodiments the controller is configured to determine a desired ratio of unsteered light to steered light based at least in part on one or more of: black level of the image data, maximum luminance of highlights in the image data and contrast of the image data.

In some embodiments the projector further comprises a combining rod downstream from the phase modulator. The combining rod may have entrance and exit apertures and light reflecting portions on opposing sides of a central longitudinal axis of the combining rod. The combining rod may be configured to combine steered and unsteered light and to homogenize the unsteered light by multiple reflections from the reflecting portions before reaching the exit aperture.

In some embodiments the combining rod is a passive optical device.

In some embodiments the combining rod comprises a hollow tube.

In some embodiments the combining rod comprises a solid body of transparent material.

In some embodiments the transparent material is at least one of glass, quartz and transparent plastic.

In some embodiments the solid body comprises a light reflective or light scattering layer or coating.

In some embodiments the combining rod comprises a hollow rectangular tube having at least one tapered face.

In some embodiments the combining rod comprises two reflective plane surfaces which taper from the entrance aperture to the exit aperture. The entrance aperture may be larger than the exit aperture.

In some embodiments the combining rod is tapered in one plane.

In some embodiments the combining rod is tapered along a horizontal axis of the combining rod.

In some embodiments the combining rod is tapered along a vertical axis of the combining rod.

In some embodiments the combining rod comprises a twisted rod.

In some embodiments the twisted rod comprises at least one turn of about 90°.

In some embodiments the combining rod comprises a body having a concave shape.

In some embodiments output angles of light from the exit aperture are about 45° or less.

In some embodiments the combining rod is configured to provide a generally symmetric output.

In some embodiments the projector further comprises a prism optically coupled to the combining rod proximate to the entrance aperture. The prism may be configured to collect the unsteered light and transmit the unsteered light into the combining rod.

In some embodiments the projector further comprises optical elements to deliver the steered and unsteered light from the phase modulator to the combining rod.

In some embodiments the optical elements comprise a physical lens positioned between the phase modulator and the combining rod.

In some embodiments the physical lens is positioned at a location which maximizes incidence of steered and unsteered light on the physical lens.

In some embodiments the projector further comprises a diffuser in an optical path of the steered light upstream of the combining rod to diffuse the steered light.

In some embodiments the projector further comprises a diffuser in an optical path of the unsteered light upstream of the combining rod.

In some embodiments the projector further comprises a diffuser downstream of the combining rod.

In some embodiments the projector further comprises optics configured to generate base illumination to increase intensity of the steered or unsteered light.

In some embodiments the optics configured to generate base illumination comprise a mirror positioned adjacent the phase modulator.

In some embodiments the mirror is positioned in a plane of the two-dimensional array of pixels of the phase modulator.

In some embodiments the mirror is parallel to the phase modulator.

In some embodiments the mirror is adjacent to one or more edges of the phase modulator.

In some embodiments the mirror partially covers the two-dimensional array of pixels of the phase modulator.

In some embodiments the optics configured to generate base illumination comprise a prism configured to pull some light out of the light beams to use as base illumination.

In some embodiments the projector further comprises one or more additional light sources configured to generate base illumination to increase intensity of the steered or unsteered light.

In some embodiments the projector comprises a camera configured to capture images of the light steered image and connected to provide the captured images to the controller.

In some embodiments the controller is configured to process the captured images of the light steered images to determine characteristics of light used to generate the light steered images and to vary one or more optical forms of the patch lenses to be displayed by the phase modulator.

In some embodiments the one or more light sources comprise emitters which emit multi-colour light.

In some embodiments the optical forms of each of the patch lenses is configured at least partially based on a wavelength of the corresponding light beam.

In some embodiments the one or more light sources comprise emitters which emit multi-colour light. The combining rod may homogenize unsteered light of different wavelengths in one or both of direction of the light and colour of the light.

In some embodiments the optical forms of each of the patch lenses is configured at least partially based on a wavelength of the corresponding light beam.

In some embodiments the projector further comprises one or more additional light sources of different wavelengths positioned to emit light into the combining rod to increase intensity of the unsteered light.

Another aspect of the invention provides a projection system. The projection system may comprise a light source operable to emit at least one light beam. The projection system may also comprise a phase modulator comprising a two-dimensional array of pixels. The pixels may be controllable to retard phase of light incident on the pixels by variable amounts. The phase modulator may have an active area in an optical path of the at least one light beam. The projection system may also comprise a controller configured to control the pixels of the phase modulator to apply a pattern of phase shifts to the light of the at least one beam of light. The phase shifts may be selected to steer the light to generate a highlight image. The projection system may also comprise optical elements arranged to deliver unsteered light that has been specularly reflected by the phase modulator to a combining rod having entrance and exit apertures and light reflecting portions on opposing sides of a central longitudinal axis and to direct the unsteered light into the entrance aperture of the combining rod such that the unsteered light is homogenized by multiple reflections from the light reflecting portions before reaching the exit aperture. The projection system may also comprise optical elements arranged to deliver the steered light to the combining rod along a path such that the steered light passes from the entrance aperture of the combining rod to the exit aperture of the combining rod without becoming homogenized and is mixed with the homogenized unsteered light at the exit aperture.

In some embodiments the combining rod is a passive optical device.

In some embodiments the combining rod is rectangular in cross section.

In some embodiments the combining rod comprises a hollow tube and the steered light passes through a bore of the hollow tubular member.

In some embodiments the combining rod comprises a solid body of transparent material.

In some embodiments the transparent material is at least one of glass, quartz and transparent plastic.

In some embodiments the solid body comprises a light reflective or light scattering layer or coating.

In some embodiments the combining rod tapers such that the entrance aperture has a larger area than the exit aperture.

In some embodiments the combining rod comprises a hollow rectangular tube having at least one tapered face.

In some embodiments the combining rod comprises two reflective plane surfaces which taper from the entrance aperture to the exit aperture. The entrance aperture may be larger than the exit aperture.

In some embodiments the combining rod is tapered in one plane.

In some embodiments the combining rod is tapered along a horizontal axis of the combining rod.

In some embodiments the combining rod is tapered along a vertical axis of the combining rod.

In some embodiments the combining rod comprises a twisted rod.

In some embodiments the twisted rod comprises at least one turn of about 90°.

In some embodiments the combining rod comprises a body having a concave shape.

In some embodiments output angles of light from the exit aperture are about 45° or less.

In some embodiments the combining rod is configured to provide a generally symmetric output.

In some embodiments the projector further comprises a prism optically coupled to the combining rod proximate to the entrance aperture. The prism may be configured to collect the unsteered light and transmit the unsteered light into the combining rod.

In some embodiments the projector further comprises optical elements to deliver the steered and unsteered light from the phase modulator to the combining rod.

In some embodiments the optical elements comprise a physical lens positioned between the phase modulator and the combining rod.

In some embodiments the physical lens is positioned at a location which maximizes incidence of steered and unsteered light on the physical lens.

In some embodiments the projector further comprises a diffuser in an optical path of the steered light upstream of the combining rod to diffuse the steered light.

In some embodiments the projector further comprises a diffuser in an optical path of the unsteered light upstream of the combining rod to diffuse the unsteered light.

In some embodiments the projector further comprises a diffuser downstream of the combining rod to diffuse combined steered and unsteered light.

In some embodiments the projector further comprises optics configured to generate base illumination to increase intensity of the steered or unsteered light.

In some embodiments the optics configured to generate base illumination comprise a mirror positioned adjacent the phase modulator.

In some embodiments the mirror is positioned in a plane of the two-dimensional array of pixels of the phase modulator.

In some embodiments the mirror is parallel to the phase modulator.

In some embodiments the mirror is adjacent to one or more edges of the phase modulator.

In some embodiments the mirror partially covers the two-dimensional array of pixels of the phase modulator.

In some embodiments the optics configured to generate base illumination comprise a prism configured to pull some light out of the light beams to use as base illumination.

In some embodiments a projection system described herein further comprises one or more additional light sources configured to generate base illumination to increase intensity of the steered or unsteered light.

Another aspect of the invention provides a combining rod for combining unsteered light that has been specularly reflected by a phase modulator with steered light which has been phase shifted by the phase modulator. The combining rod may comprise entrance and exit apertures. The combining rod may also comprise light reflecting portions on opposing sides of a central longitudinal axis of the combining rod. Unsteered light incident on the reflecting portions may be homogenized by multiple reflections from the reflecting portions before reaching the exit aperture.

In some embodiments the combining rod comprises any feature described elsewhere herein.

Another aspect provides a method for aligning elements of a projector system.

The method may comprise capturing an image of a generated light pattern. The method may also comprise identifying characteristic features of the light pattern in the captured image. The method may also comprise comparing the identified characteristic features to one or more reference features. The method may also comprise varying one or more optical forms of displayed patch lenses based on the comparison of the identified characteristic features to the one or more reference features.

In some embodiments the characteristic features include at least one of position, shape, intensity and uniformity of individual portions of the light pattern.

In some embodiments varying one or more optical forms of the displayed patch lenses comprises varying at least one of:

- focal length of a corresponding patch lens;
- location of an optical center of the corresponding patch lens;
- lens tilt of the corresponding patch lens;
- size of the corresponding patch lens; and
- position of a lens area of the corresponding patch lens within a distinct region of a phase modulator.

In some embodiments varying one or more optical forms of the displayed patch lenses comprises: moving a center of a corresponding patch lens to find a best center location; and adjusting one or both of lens focal length and size of the corresponding patch lens.

In some embodiments varying one or more optical forms of the displayed patch lenses further comprises adjusting a tilt of the corresponding patch lens.

In some embodiments the optical forms are varied sequentially.

In some embodiments a plurality of the optical forms are varied concurrently.

In some embodiments the method comprises differentiating between parts of the light pattern which originate from different light beams by at least one of: turning the light beams on one at a time;

- turning the light beams off one at a time;
- varying intensities of one or more of the light beams in known ways;
- changing different beam properties for different ones of the light beams;
- applying different light steering components to different ones of the light beams; and
- varying optical forms of each patch lens to vary beam patterns at different rates and/or in different directions.

Another aspect provides a method for powering on a projector system having any feature(s) described herein. The method may comprise retrieving from a data store a plurality of optical forms corresponding to a plurality of patch lenses to be displayed by a phase modulator. The method may also comprise controlling the phase modulator to display the retrieved optical forms to correct for non-uniformities of light beams incident on the phase modulator.

In some embodiments the method for powering on the projection system may also comprise capturing an image of a light pattern generated by the projector system. The method may also comprise varying one or more of the retrieved optical forms based on a comparison of identified features in the captured image with reference features.

Another aspect provides a method for projection an image. The method may comprise emitting at least one beam of light from a light source. The method may also comprise illuminating an active area of a phase modulator comprising a two-dimensional array of pixels with the at least one beam of light. The pixels may be controllable to retard phase of light incident on the pixels by variable amounts. The method may also comprise controlling the pixels of the phase modulator to apply a pattern of phase shifts to the light of the at least one beam of light. The phase shifts may be selected to steer the light to generate a highlight image. The method may also comprise delivering unsteered light (which may be light that has been specularly reflected by the phase modulator and/or other unsteered light) to a combining rod having entrance and exit apertures and light reflecting portions on opposing sides of a central longitudinal axis and directing the unsteered light into the entrance aperture of the combining rod such that the unsteered light is homogenized by multiple reflections from the light reflecting portions before reaching the exit aperture. The method may also comprise delivering the steered light to the combining rod along a path such that the steered light passes from the entrance aperture of the combining rod to the exit aperture of the combining rod without becoming homogenized and is mixed with the homogenized unsteered light at the exit aperture.

Further aspects and example embodiments are illustrated in the accompanying drawings and/or described in the following description.

It is emphasized that the invention relates to all combinations of the above features, even if these are recited in different claims.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Definitions

"steered light" as used herein means a portion of light incident on a spatial phase modulator (or phase modulators) whose phase has been controllably modulated by the phase modulator to cause the portion of light to be directed to a location on an image plane that is determined by a phase pattern applied to the phase modulator. By changing the phase pattern the portion of light may be directed to illuminate different locations on the image plane. The steered light is directed by interference of light that has been phase shifted by different controllable elements (pixels) of the phase modulator.

"unsteered light" as used herein means a portion of light that is incident on the phase modulator(s) which is not steered light. Unsteered light may include a portion of light incident on a spatial phase modulator that is specularly reflected by the spatial phase modulator.

"desirable light-field" as used herein means a light-field having a desired shape, propagation direction and/or angles to efficiently couple with a common optical system (e.g. image forming optics).

"output optics" as used herein means image forming optics which may comprise a spatial amplitude modulator and/or associated projection optics to form a final image on a screen or a relay system giving an intermediate image.

"light-steered image" as used herein means an image produced by output optics when steered light is provided to the output optics. Examples of light-steered images include a final on-screen image and an intermediate image.

"highlight image" as used herein means an image formed by the steered light or a portion of the light comprising the light-steered image.

"patch lens" as used herein means a phase pattern applied by a specific region of a phase modulator which acts as a lens. In some embodiments a specific patch lens is illuminated by a single beam of light. The patch lens may be configured to cause the single beam of light to provide a desirable light field. A set of patch lenses corresponding to a set of distinct light beams may be configured to compensate for differences between the distinct light beams.

"optical form" of a patch lens means the specific phase shifts applied to pixels in the area of a spatial phase modulator that corresponds to the patch lens. An optical form may be characterized by characteristics such as focal length, optical centre shift, astigmatism, tilt, size, etc. of the patch lens.

Description

Figure 1:
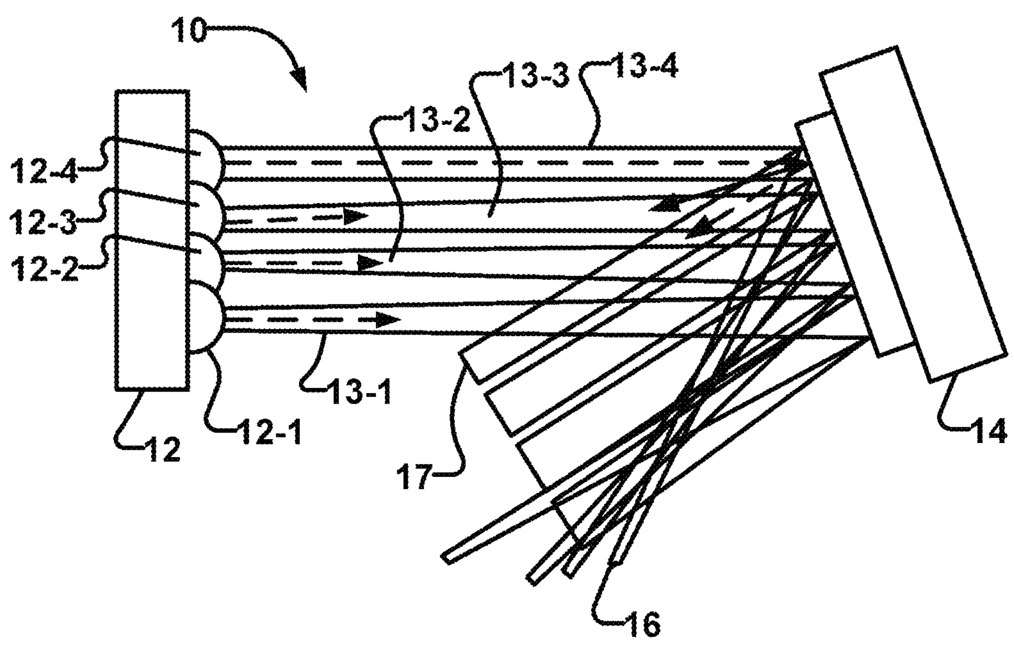
FIG. 1 is a schematic illustration of an optical arrangement according to an example embodiment of the invention.

FIG. 1 shows an example optical arrangement 10. Optical arrangement 10 may be designed to generate a desired light beam which illuminates a projector imager or other downstream optics. Optical arrangement 10 comprises a multi-emitter light source 12 illuminating a spatial phase modulator 14. Multi-emitter light source 12 comprises a plurality of individual light emitters 12-1, 12-2, 12-3, . . . , 12-N−1, 12-N. Each of the individual light emitters generates a corresponding beam of light 13-1, 13-2, 13-3, . . . , 13-N−1, 13-N respectively (collectively beams 13). Multiple-emitter light source 12 may be placed relative to phase modulator 14 to maximize incidence of beams 13 on phase modulator 14.

In some embodiments multi-emitter light source 12 comprises at least two rows and two columns of light emitters. In some embodiments multi-emitter light source 12 comprises a plurality of light emitting diode (LED) emitters, a plurality of laser diodes and/or the like.

It can be desirable to combine light from plural light emitters 12-1, . . . , 12-N of one or more multiple emitter light sources 12. This arrangement can provide a large amount of light which may be useful, for example, in creating bright images on a large cinema screen and/or creating images with very high light intensities for industrial processes.

Multi-emitter light source 12 may output beams 13 that are non-uniform. For example, individual beams 13 may have different pointing parallelism, collimation, intensity distributions, etc. In applications where high quality images are required, these non-uniformities can present significant problems.

Phase modulator 14 comprises a diffractive optical element. The diffractive optical element comprises a two-dimensional (2D) array of pixels which are each controllable to retard a phase of light incident on the pixel by a selected amount.

Figure 1A:
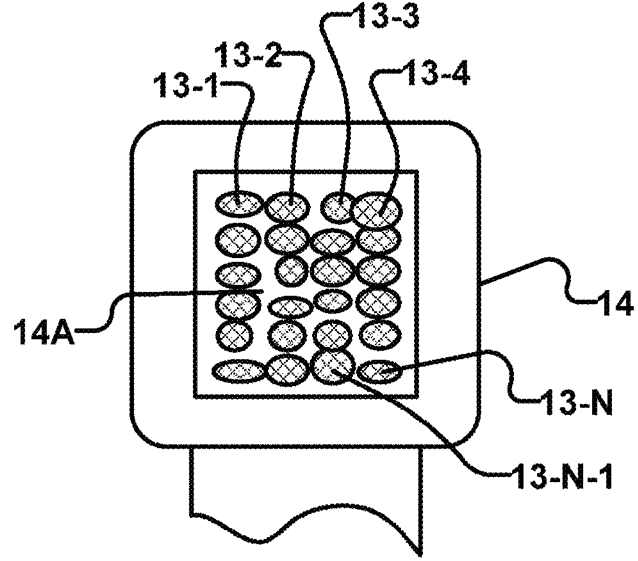
FIG. 1A is a schematic illustration of an example illumination of a phase modulator of the FIG. 1 optical arrangement.

Deviations from ideal of individual beams 13 may result in non-ideal illumination of phase modulator 14 (see e.g. FIG. 1A). For example, an individual beam 13 that is not pointing in the correct direction, not properly collimated and/or has an undesired intensity distribution may not provide a desired light field on phase modulator 14. The non-ideal illumination of phase modulator 14 may result in non-ideal illumination of an optical system downstream from phase modulator 14 (e.g. a projector imager).

In some embodiments ideal beams 13 would:

- each illuminate a specific corresponding region of phase modulator 14; and/or
- each illuminate a corresponding region with a specified light distribution (e.g. a uniform light distribution); and/or
- collectively illuminate non-overlapping regions on phase modulator 14.

Phase modulator 14 may be controlled as described herein to combine beams 13 to illuminate a downstream optical system. In doing so, phase modulator 14 may be controlled to compensate for some or all of the above-mentioned deviations from ideal of beams 13.

One aspect of the technology described herein provides systems and methods for correcting for non-uniformities of beams 13. In some embodiments each beam 13 illuminates a corresponding discrete region of phase modulator 14. Each region of phase modulator 14 may be controlled to provide a patch lens having an optical form which corrects for the specific non-uniformities present in the corresponding beam 13. The optical forms applied to correct different beams 13 may be different.

The optical form for the patch lens for each beam 13 may be based on measured deviations from ideal of the corresponding beam 13 and/or deviations from ideal of a light field produced at an image plane after the beam 13 has interacted with phase modulator 14.

Individual beams 13 may have variations in pointing parallelism and/or variations in collimation uniformity. The deviations from ideal of the individual beams 13 may be measured for each beam. Based on the measured deviations, an optical form for a patch lens designed to correct for the measured non-uniformities may be generated. Phase modulator 14 may be controlled to display the generated optical forms.

Figures 2A, 2B, 2C:
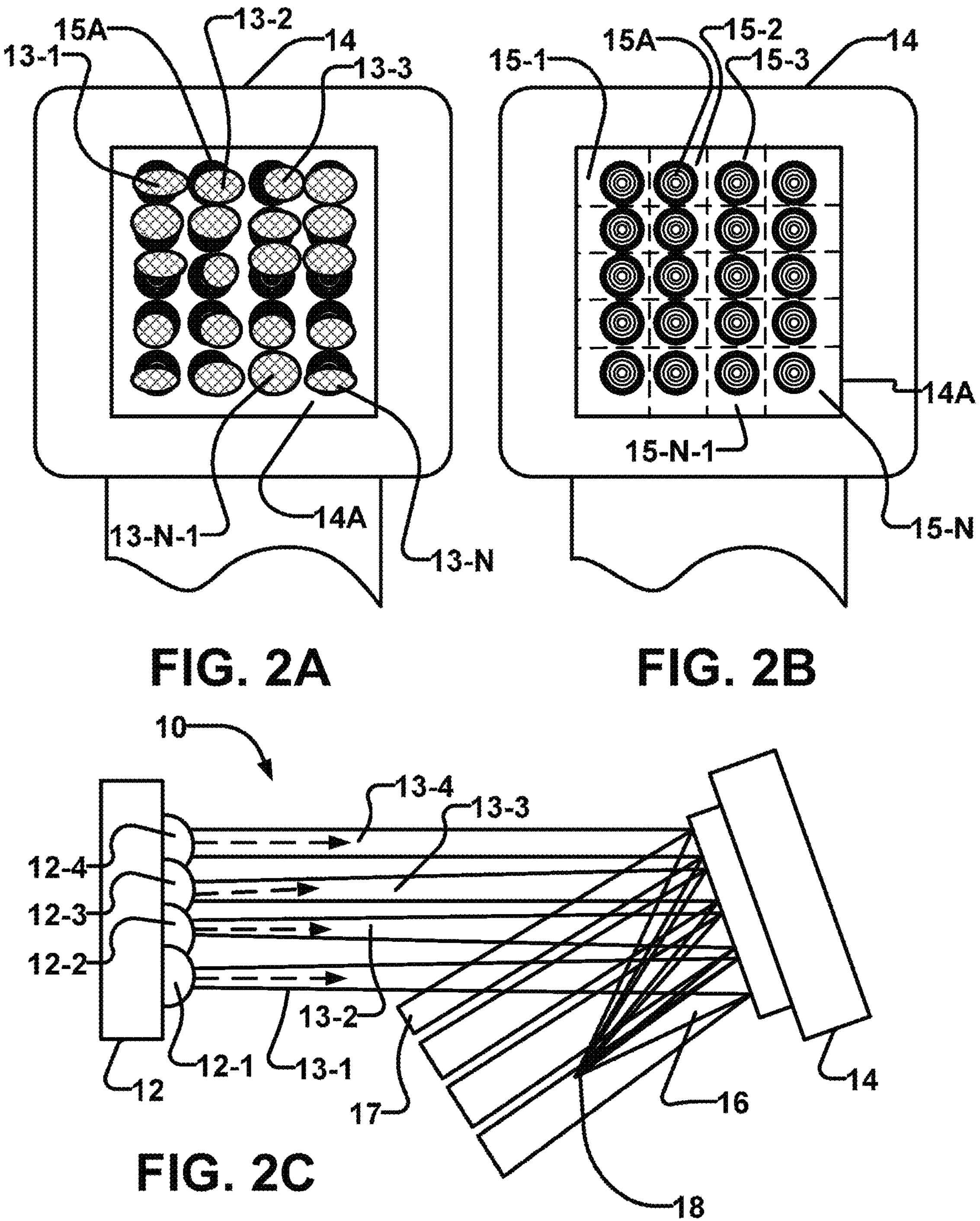
FIG. 2A is a schematic illustration of an example illumination of a phase modulator.
FIG. 2B is a schematic illustration of the phase modulator of FIG. 2A.
FIG. 2C is a schematic illustration of an optical arrangement according to an example embodiment of the invention.

As shown in FIG. 2A, each individual beam 13 illuminates a corresponding region of an active surface 14A of phase modulator 14. If one or more multi-emitter light sources 12 comprise N light sources and therefore there are N corresponding beams 13, then active surface 14A may be divided into N corresponding regions (e.g. regions 15-1, 15-2, 15-3, . . . , 15-N−1, 15-N (collectively regions 15)). Each region 15 may be individually controlled to display a "patch lens" 15A which has a corresponding optical form designed to correct for deviations from ideal present in the corresponding beam 13. Patch lenses 15A displayed by different regions 15 may be the same or may be different. In the Figures, patch lenses 15A are sometimes shown schematically as spaced apart circular forms. However, patch lenses 15A may cover areas of other shapes (e.g. rectangular regions 15) and adjacent patch lenses 15A may abut one another. In some embodiments, the entire active area 14A of phase modulator 14 is covered by patch lenses 15A.

FIG. 2B schematically shows regions 15 of active surface 14A of phase modulator 14 displaying patch lenses 15A.

The optical form of each patch lens 15A may be generated independently. By generating the optical form of each patch lens 15A independently, the optical form can advantageously correct for deviations from ideal such as non-uniformities that are present in the individual beam 13 for which the optical form is generated. The optical forms may, for example, be designed to correct for varying pointing parallelism and/or varying collimation uniformity of beams 13.

Phase patterns corresponding to individual patch lenses 15A may be generated by optimization processes for example, as described herein. These processes may, for example, observe characteristics of an output beam or part of an output beam corresponding to a particular one of beams 13. The processes may iteratively vary phase shifts of the corresponding patch lens 15A until the observed characteristics of the output beam indicate that the patch lens 15A is suitably correcting for deviations from ideal of the individual beam 13. Such processes may be performed in sequence and/or in parallel for all of individual beams 13. Example processes for generating phase patterns for patch lenses 15A are described below with reference to FIG. 12.

Optimization processes may vary depending on what form if any is assumed for phase shifts corresponding to patch lenses 15A. In some embodiments patch lenses 15A have no pre-defined form. In such embodiments an optimization may be performed over possible phase shifts for all pixels of a region 15 to find a pattern of phase shifts that suitably corrects for deviations from ideal of the corresponding individual beam 13. Such processes may apply optimization approaches such as simulated annealing to find phase shifts for the region 15 which will make up the phase pattern for the corresponding patch lens 15.

In some embodiments patch lenses 15A are specified by a parameterized lens model. The parameterized model may include parameters which specify factors such as focal length, optical centre shift, parameterized astigmatism, tilt, etc. for a corresponding patch lens 15A. For a specific set of these parameters the model may output a phase pattern for the corresponding patch lens 15A. The phase pattern may specify phase shifts to be applied to each pixel of a corresponding region 15 of phase modulator 14.

In cases where patch lenses are specified by parameterized lens models optimization may be performed over the parameters of the lens model to find a set of parameters that specify a patch lens 15A that suitably corrects for deviations from ideal of the corresponding individual beam 13.

In some embodiments an individual region 15 may be divided into sub regions and a patch lens 15A is specified by a parameterized lens model for each of the sub-regions. A patch lens 15A applied to such a region may have a different part corresponding to each sub region (e.g. parts 15A-1 and 15A-2 in FIGS. 2D and 2E). In some such embodiments boundaries of the sub-regions are also parameterized. In such embodiments optimization may involve one or more of: determining whether or not to specify separate parameterized lens models for different sub regions, determining parameters that determine locations of one or more boundaries of the sub-regions, and determining parameters for the parameterized lens models corresponding to each of the regions.

Figure 2D:
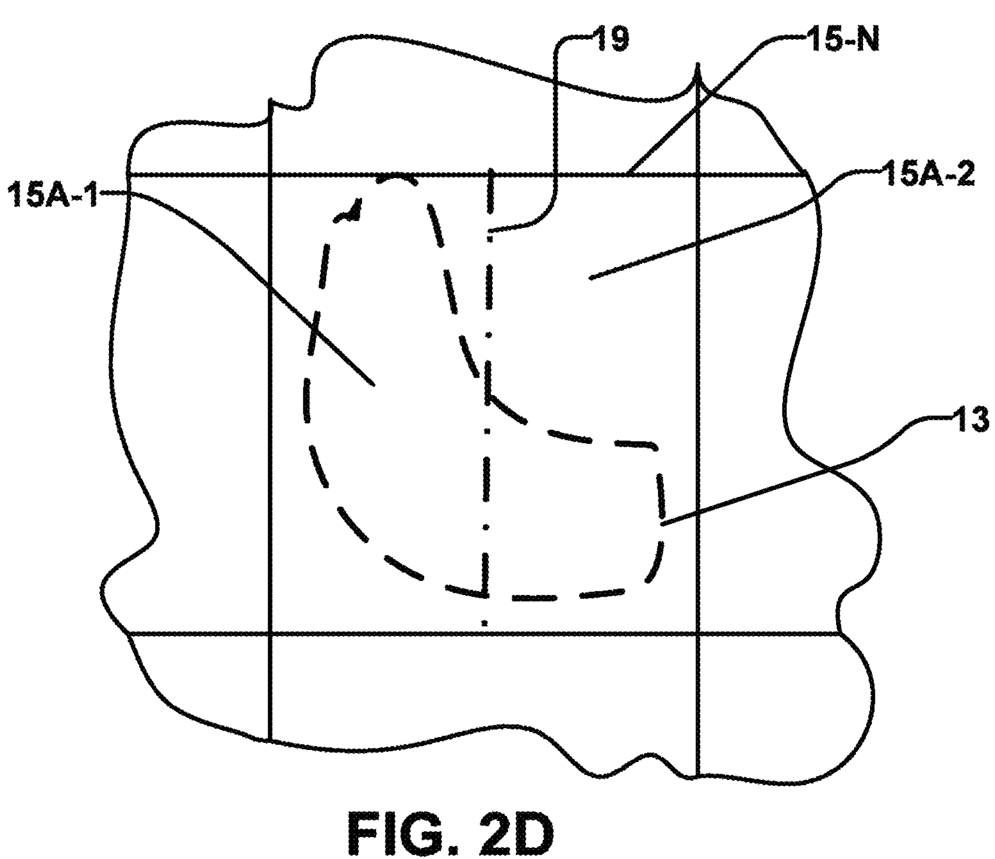
FIGS. 2D and 2E are schematic illustrations showing how a patch lens may have different lens characteristics in different sub-regions of a region of a phase modulator.
Figure 2E:
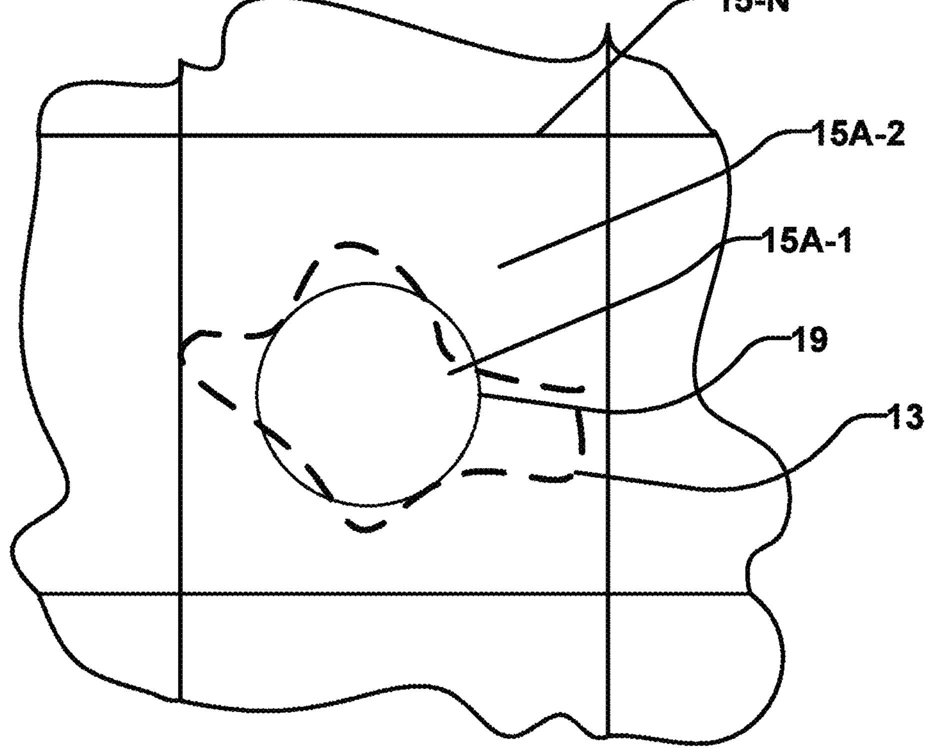

In such embodiments different parts of a single beam 13 may illuminate two or more sub regions of a corresponding region 15. Phase patterns in each of the sub regions may be set to emulate lenses having different characteristics. FIGS. 2D and 2E are non-limiting examples. Parameters of a lens model (e.g. focal length, center position, size, tilt) may be specified independently for two or more sub-regions defined by one or more boundaries 19. Boundaries 19 may be defined by parameters such as locations of end points or form of the boundaries between end points. In some embodiments (see FIG. 2E) boundaries 19 include closed shapes. For such boundaries 19 parameters may include a center location, a parameter specifying a shape of the boundary (e.g. a degree of eccentricity), a parameter specifying a diameter or size of the sub-region within the boundary 19, etc.

FIG. 2E is an example of a case where two sub-regions may be defined by a single sub-region. Parameters of one lens model may be fit to an interior of boundary 19 and parameters of another lens model may be fit to the sub-region outside boundary 19.

In some cases an optical form (pattern of phase shifts) in one sub region can be considered to correspond to a plurality of lenses (e.g. spherical lenses) superposed on one another (e.g. the phase pattern for a sub-region may be arrived at or understood as a smaller lens superposed on a portion of a larger lens). In some cases the displayed optical forms correspond to a plurality of distinct lenses (e.g. lenses in sub-regions that are adjacent to one another) which are illuminated by the same beam 13.

Figure 2F:
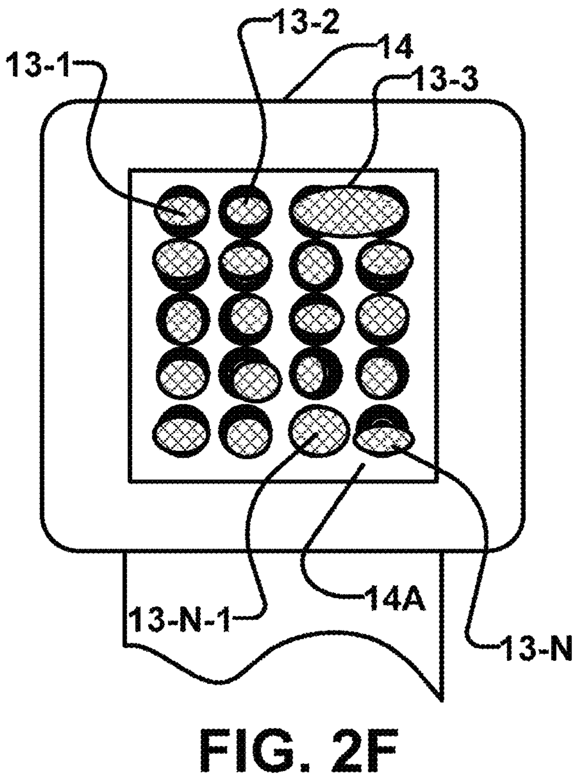
FIG. 2F is a schematic illustration showing how a light beam may interact with two or more patch lenses.

FIG. 2F illustrates another example case in which lens models may be fit to correct deviations from ideal of different parts of a single beam 13. In the embodiment illustrated in FIG. 2F some beams 13 are large enough to extend over two regions 15 (see e.g. beam 13-3). For these beams 13 each of two or more patch lenses 15A may be configured to correct for deviations from ideal in the corresponding part of the beam 13.

The pixels of active surface 14A of phase modulator 14 corresponding to a specific region 15 may be controlled:

- To display an optical form corresponding to a patch lens 15A (which optionally comprises two or more sub-regions within which phase patterns are individually optimized); and/or
- For different groups of pixels to display different optical forms corresponding to different patch lenses 15A (e.g. a beam 13 illuminates two or more patch lenses 15A).

Patch lenses 15A may be specified at different times in the life of apparatus as described herein. For example, patch lenses 15A may be specified during an initial calibration conducted when the apparatus is new or still under manufacture. Patch lenses 15A may also be specified as part of a field calibration when apparatus as described herein is first installed at a new location. The field calibration may correct for misalignments that may occur as a result of shipping or installation and/or issues with beams 13 resulting from the environment in which the apparatus is installed. Patch lenses 15A may be refined as part of a power on routine for apparatus as described herein and/or as part of a selectable calibration routine.

In some embodiments optical forms for one or more patch lenses 15A are controlled in real time to account for varying characteristics of beams 13 (e.g. a time-varying misalignment of source 12 with phase modulator 14).

Combination of Correction and Light Steering

In addition to correcting and combining beams 13, phase modulator 14 may be controllable to steer light to desired locations in an image plane. Light steering may be performed by applying patterns of selected phase retardation to light that is incident on different pixels of phase modulator 14. The portion of light from beams 13 that is diffracted in one or more desired directions or "steered" leaves phase modulator 14 as steered light 16.

The above mentioned deviations from ideal of beams 13, if left uncorrected can result in portions of steered light 16 which originate from different beams 13 not being properly aligned. For example, consider the case where it is desired to generate a very bright highlight by controlling phase modulator 14 to concentrate steered light from all of beams 13 at the same small area or spot in an image plane.

As illustrated in FIG. 1, deviations of beams 13 from ideal can cause steered light 16 originating from different beams 13 to be focused at different distances from the image plane and/or directed to different locations on the image plane instead of all being focused in the same way at the same location in the image plane. The variation in focal points can result in an overall large point spread function (PSF) of steered light 16 and an eventual image that is out of focus or includes undesirable artifacts. The same problem exists where it is intended to steer light to multiple different locations on the image plane and/or it is intended to steer light that originates from some beams 13 differently from light that originates in other beams 13.

Where light steering is desired the optical form applied to each of beams 13 may additionally include phase shifts which generate desired steered light. The optical form may for example comprise a patch lens component 15A which corrects the corresponding beam 13 and a light steering component. The patch lens component and the light steering component may be superposed (e.g. by adding phase shifts specified by each of the patch lens component and the light steering component—the addition may be modulo $2\pi$ or a multiple of $2\pi$ so that the resulting phase shifts are within a range of phase modulator 14). Thus the optical form provided by phase modulator 14 may simultaneously correct for non-uniformities in beams 13 and steer light of beams 13.

The light steering components applied to different beams 13 may be the same or different. For example, in some embodiments it is desired to steer light to one or more highlights and the light steering components for each of beams 13 is configured to steer light to each of the one or more highlights. As another example, in some embodiments it is desired to steer light to a plurality of different highlights and the light steering components for different ones of beams 13 are configured to steer light to different subsets of the plurality of highlights. In some embodiments, the different subsets of the plurality of highlights are distinct. In some embodiments, at least some of the different subsets of the plurality of highlights include highlights in common. In some embodiments the light steering components are configured to steer beams 13 to converge at a plurality of different points. For example, some of beams 13 may be steered to converge at a first point, some of beams 13 may be steered to converge at a second point and some of beams 13 may be steered to converge at a third point, where the first point, second point and third point are different points.

In some embodiments each region 15 is individually controlled to display a pattern of phase shifts which steers light from the corresponding beam 13 to produce steered light 16. Light from beams 13 may be steered so that light is concentrated in certain areas of the image plane (one can say that the light is steered toward such areas). Light from beams 13 may also be steered so that less light is provided to certain areas of the image plane (one can say that the light is steered away from such areas). The areas to which light is steered toward may have light intensities well above the maximum intensity that would be possible if all of the light from beams 13 were uniformly distributed over an image area of the image plane. Beams 13 may be steered to one or more different areas. For example, beams 13 may be steered to the same area. For example, some of beams 13 may be steered to a first area while other beams 13 are steered to a second different area.

Light steering may be applied to create high dynamic range images in cinema, displaying technical or medical images and/or industrial processes. Light steering may be controlled in response to image data such that light is steered toward areas for which the image data specifies higher luminance and/or light is steered away from areas for which the image data specifies low luminance levels. Light steering can beneficially help to accurately produce images for which there are large variations in specified luminance for different locations in an image. For example, light steering may help to produce natural images of scenes such as sunlight shining on water, bright stars of variable size in a dark night sky, a sunset with shadows in the foreground, etc.

FIG. 2C illustrates optical arrangement 10 in which phase modulator 14 is controlled to correct for deviations from ideal of beams 13 and to steer the light from each beam 13 so that the light from all of beams 13 is focused at a focal point 18. As shown in FIG. 2C, corrections applied by patch lenses facilitate causing steered light 16 originating from all of beams 13 to converge at focal point 18 (or more generally to be steered to have any other desired distribution over the image plane). The more comprehensively the deviations from ideal of beams 13 are corrected, the more accurately the steered light 16 originating from different beams 13 can be registered together (e.g. to converge at a single focal point 18 or to be steered accurately to different highlights at specific locations on the image plane). Having steered light 16 that originates from different beams 13 accurately registered is advantageous because illuminating a projector imager (or other downstream optics) with such light can produce a well-focused and accurate highlight image.

The optical forms of patch lenses 15A and the phase shifts for light steering may be calculated independently of each other. In other embodiments, the optical forms of patch lenses 15A and the phase shifts for light steering may be calculated together. The phase shifts for patch lenses 15A and light steering components may be superimposed. Thus the correction of deviations from ideal present in beams 13 and the light steering of beams 13 may occur simultaneously.

Figure 3:
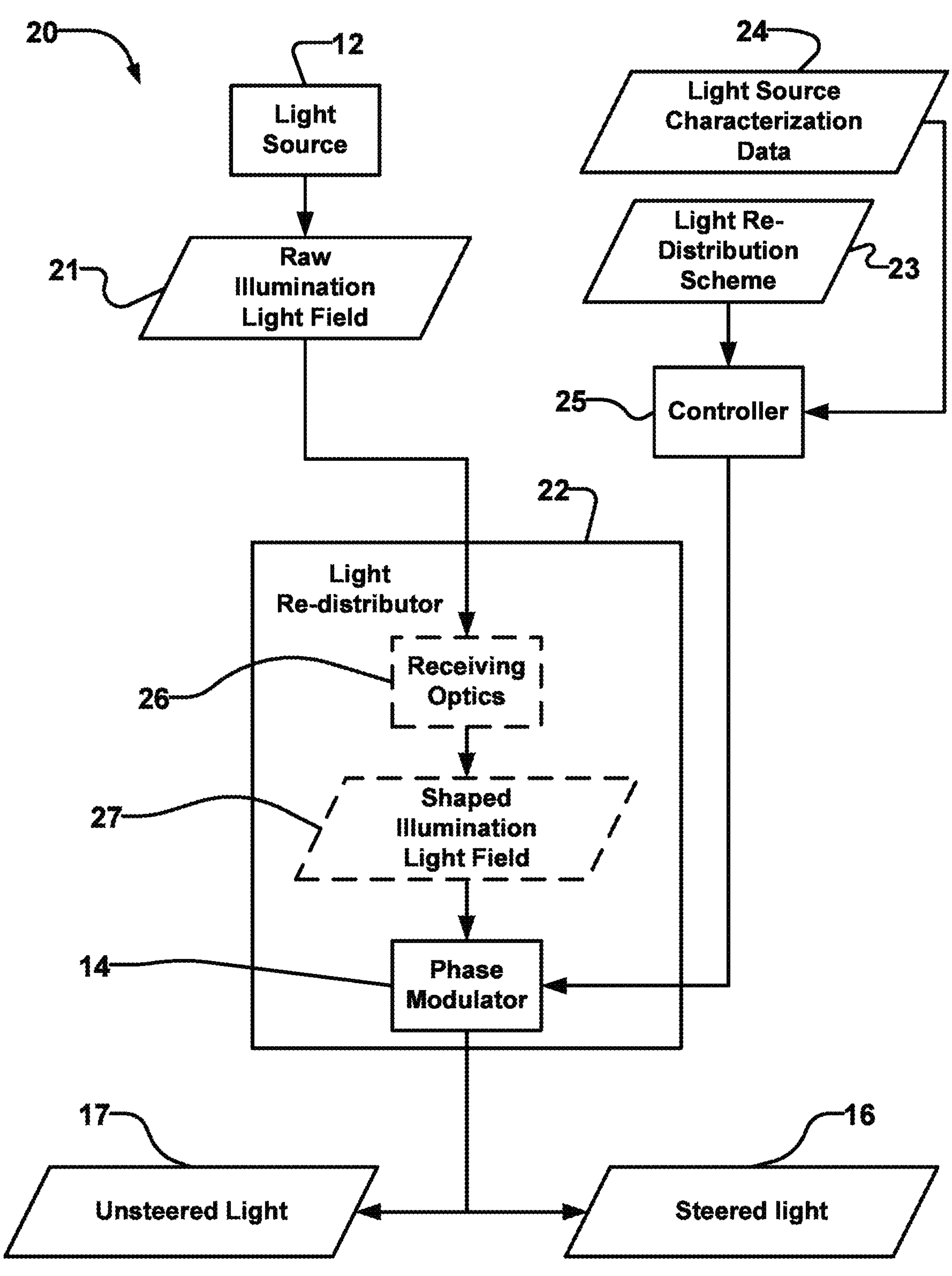
FIG. 3 is a schematic block diagram of an optical arrangement according to an example embodiment of the invention.

FIG. 3 is a block diagram schematically showing an example optical arrangement 20. Multi-emitter light source 12 generates a raw illumination light field 21 (e.g. beams 13). As described elsewhere herein raw illumination light field 21 may comprise a plurality of non-ideal light beams having varying characteristics such as varying pointing parallelism, varying collimation uniformity and/or the like. Raw illumination light field 21 is directed into light re-distributor module 22.

Light re-distributor module 22 comprises phase modulator 14 which is illuminated by raw illumination light field 21. Phase modulator 14 receives as input control signals which set the phase retardation applied by individual pixels of phase modulator 14 to provide a specified phase pattern. A controller 25 generates a light steering component of the phase pattern according to a light re-distribution scheme 23. Light re-distribution scheme 23 may, for example, process image data to generate a pattern of phase shifts which will steer light toward higher luminance regions defined in the image data and/or which will steer light away from lower luminance regions defined in the image data.

Light re-distributor module 22 may direct the steered light to an input of a downstream optical system (e.g. towards a projector imager to illuminate an imaging plane of the projector imager). Light re-distribution scheme 23 may, for example incorporate methods as described in international PCT Publication No. WO2015054797A1 entitled LIGHT FIELD PROJECTORS AND METHODS, in international PCT Publication No. WO2016015163A1 entitled NUMERICAL APPROACHES FOR FREE-FORM LENSING: AREA PARAMETERIZATION FREE-FORM LENSING and in international PCT Publication No. WO2015184549A1 entitled EFFICIENT, DYNAMIC, HIGH CONTRAST LENSING WITH APPLICATIONS TO IMAGING, ILLUMINATION AND PROJECTION, which are hereby incorporated herein by reference for all purposes.

Additionally, controller 25 preferably receives or obtains light source characterization data 24 which provides characteristics of the light field (e.g. raw illumination light field 21) which illuminates phase modulator 14. The characteristics may include pointing directionality and/or collimation information for the light field (e.g. characteristics of beams 13 which contribute to the light field). Controller 25 may process light source characterization data 24 to generate optical forms for patch lenses 15A to be displayed by phase modulator 14 to correct for deviations from ideal of light field 21 which illuminates phase modulator 14. Light source characterization data 24 may be obtained by measuring characteristics of the light field emitted from light source 12 (e.g. beams 13) during a calibration procedure and/or in real time as light re-distributor module 22 is operating.

Patch lenses 15A and the phase shifts for light steering may be superimposed. Thus, the correction of raw illumination light field 21 and the steering of raw illumination light field 21 may occur simultaneously.

A portion of raw illumination light field 21 is output as steered light 16 (e.g. to illuminate an imaging plane of a projector imager). As discussed elsewhere herein a portion of raw illumination light field 21 may be steered to one or more different points or areas. Another portion of raw illumination light field 21 leaves light re-distributor module 22 as unsteered light 17.

In some embodiments light re-distribution module 22 comprises receiving optics 26 upstream from phase modulator 14. Receiving optics 26 may shape or modify raw illumination light field 21 to better illuminate phase modulator 14. For example, raw illumination light field 21 may be wider than active surface 14A of phase modulator 14. Receiving optics 26 may shape raw illumination light field 21 for raw illumination light field 21 to match a size of active surface 14A of phase modulator 14. Additionally, or alternatively, receiving optics 26 may align raw illumination light field 21 with active surface 14A of phase modulator 14. In such embodiments shaped illumination light field 27 illuminates phase modulator 14.

Utilization of Unsteered Light

Most or all real phase modulators cannot phase modulate all incident light. It is practically unavoidable that a phase modulator will output at least some unsteered light. For example, where phase modulator 14 is a reflective phase modulator, some light will generally be specularly reflected from surfaces of the phase modulator. This results in unsteered light 17. The ratio between steered light 16 and unsteered light 17 may depend on a diffraction efficiency of phase modulator 14.

In some embodiments, phase patterns selected to cause specular reflection of some or all light from beams 13 may be displayed to increase the amount of unsteered light that is available. This may be done, for example, at times when a highlight image is not needed and/or times when a highlight image does not require very much optical power and/or times when extra background illumination is required.

For example, where a highlight image is not required all pixels in active area 14A or all pixels in parts of active area 14A that are illuminated by beams 13 may be set to display patterns of phase shift which cause specular reflection of the light from beams 13.

In cases where it is desired to retain some steered light, individual regions 15 or parts of some or all regions 15 may be set to display patterns of phase shift which cause specular reflection of the light incident on them. Remaining regions 15 and/or parts of regions 15 may be set to display phase patterns that cause desired light steering for a steered light component. Increasing the amount of unsteered light may increase intensity of the base illumination. This may increase efficiency, reduce power consumption, etc. of a projection system. In some embodiments a size (e.g. a surface area) of one or more patch lenses 15A is reduced and the pixels of the corresponding region(s) 15 which no longer display an optical form associated with the patch lenses 15A are set to display patterns of phase shift which cause specular reflection to increase an amount of unsteered light.

In some embodiments a proportion of the incident light to be reflected as unsteered light (and thereby how much light is going to be steered light) is determined during a calibration stage. In some cases the proportion is at least partially based on power levels of the individual light emitters 12.

It may be desirable to separate steered light from unsteered light. Doing so can facilitate separate control of the steered and unsteered light. For example, it may be desirable to collect unsteered light in an optical path and to shift the direction of steered light 16 so that the steered light 16 does not enter the optical path of the unsteered light 17.

In some embodiments separation of the steered and unsteered light is created or increased by shifting the direction of steered light 16 relative to unsteered light 17. Such a shift may be generated by patch lens components and/or light steering components of the phase pattern applied by phase modulator 14.

As described elsewhere herein, unsteered light 17 may be focused to a spot adjacent an input diffuser (e.g. input diffuser 47 described elsewhere herein) which is near an input of homogenization and/or recombination optics 42. Since increasing a steering angle of light by phase modulator 14 generally decreases efficiency, it is desirable to make the angular separation between steered light 16 and unsteered light 17 relatively small.

In some embodiments the lateral separation between the points at which steered light 16 and unsteered light 17 are focused is less than 100 mm or less than 60 mm or less than 10 mm.

In some embodiments both steered light 16 and unsteered light 17 are directed to an image plane. For example, unsteered light 17 may provide base level illumination in an image area of the image plane and steered light 16 may provide a highlight image which increases light intensity in parts of the image area corresponding to highlights.

Figure 4:
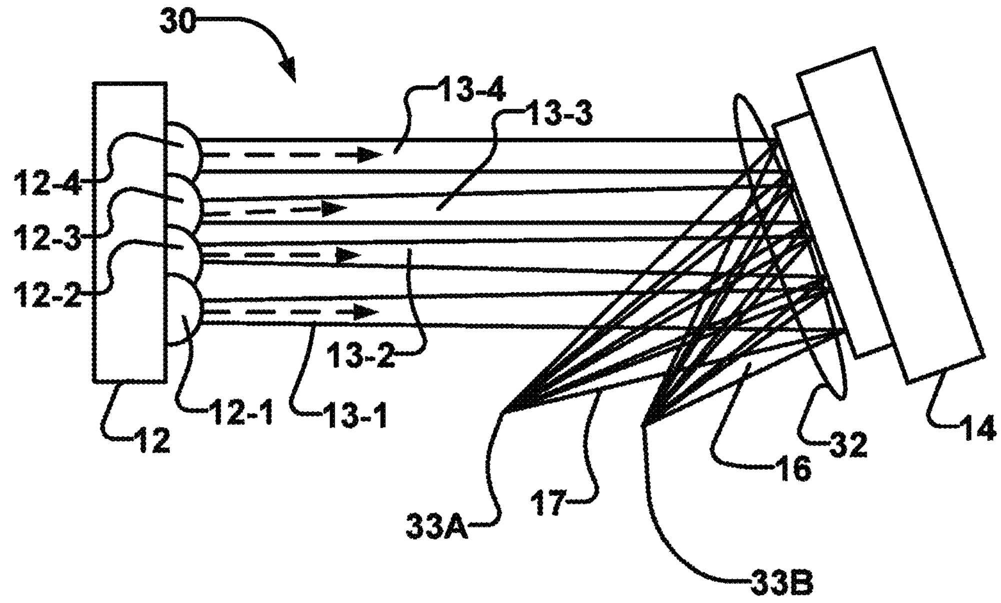
FIG. 4 is a schematic illustration of an optical arrangement according to an example embodiment of the invention.

FIG. 4 schematically shows an optical arrangement 30 which may be applied to direct both steered light 16 and unsteered light 17 to an image plane. Optical arrangement 30 is the same as optical arrangements 10 and 20 except that optical arrangement 30 comprises a physical lens 32. Physical lens 32 may be placed at a location that maximizes the incidence of steered light 16 and unsteered light 17 on physical lens 32. Physical lens 32 focuses unsteered light 17 at a focal point 33A. Steered light 16 is focused at focal point 33B.

In optical arrangement 30, the directionality of:

- unsteered light 17 is dependent on properties of physical lens 32; and
- steered light 16 is dependent on both the properties of physical lens 32 and the phase patterns displayed by phase modulator 14 (e.g. patch lenses 15A displayed by phase modulator 14 and a light steering component displayed by phase modulator 14).

Once both steered light 16 and unsteered light 17 are focused, they can be combined together into a single light field. Combining steered light 16 and unsteered light 17 may advantageously result in:

- a higher overall luminance in a projected image;
- more efficient use of light emitted from source 12;
- reduced performance requirements to dissipate (e.g. absorb) energy from unused light emitted by source 12;
- etc.

Figure 5:
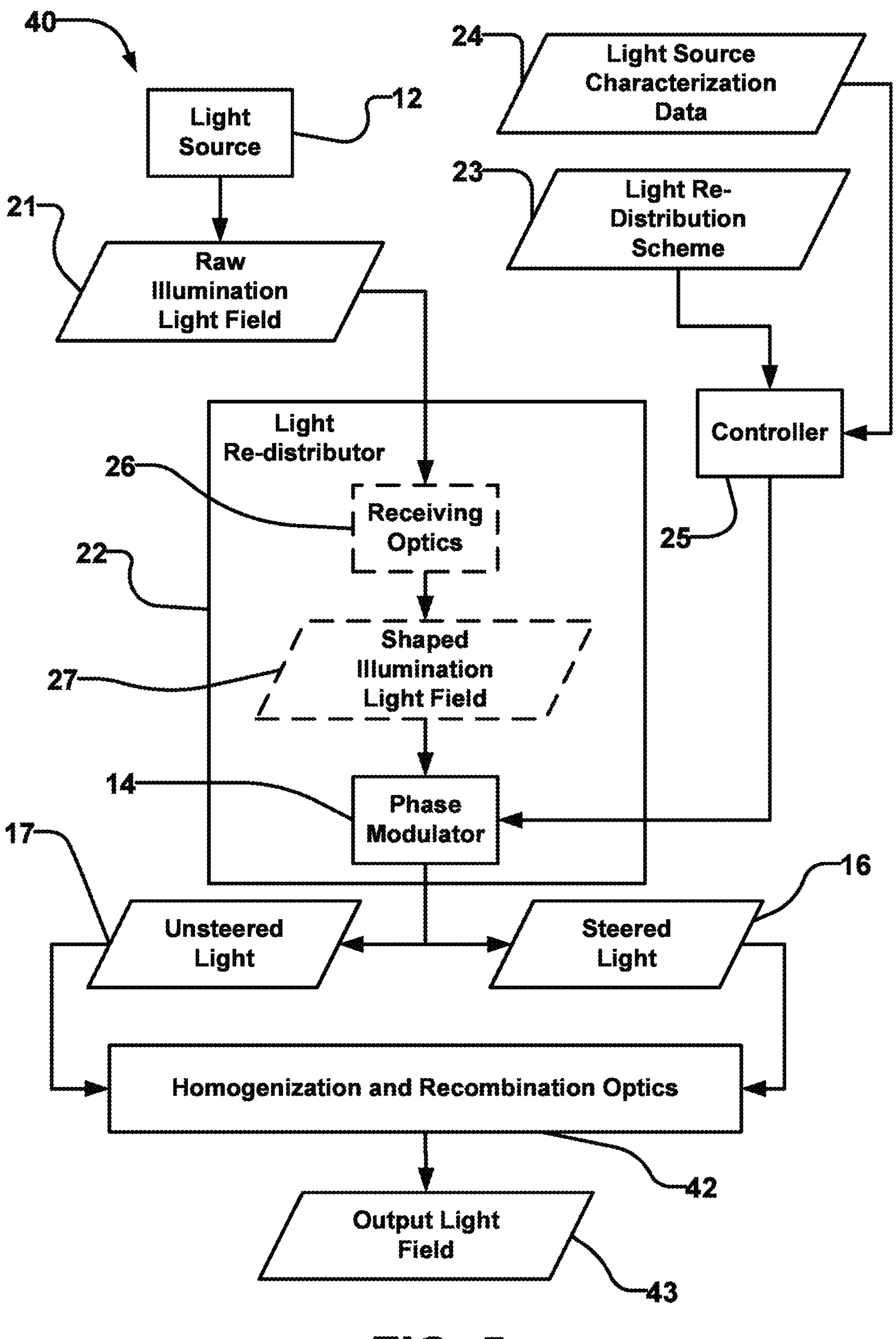
FIG. 5 is a schematic illustration of an optical arrangement according to an example embodiment of the invention.

FIG. 5 schematically shows an optical arrangement 40 which is configured to combine steered light 16 and unsteered light 17. Optical arrangement 40 may be the same as optical arrangement 20 described elsewhere herein except that optical arrangement 40 additionally comprises homogenization and/or recombination optics 42 which generate an output optics light field 43.

Homogenization and/or recombination optics 42 receive steered light 16 and unsteered light 17 and combine steered light 16 and unsteered light 17 into a single light field which is output from homogenization and/or recombination optics 42 as output light field 43.

Output light field 43 may, for example, illuminate a projector imager (or other downstream optics for generating an image). In some embodiments output light field 43 generated by homogenization and/or recombination optics 42 efficiently couples to a projector imager or other downstream optics. In some embodiments homogenization and/or recombination optics 42 are configured to generate a light field which has an appropriate shape, propagation direction, angles of incidence and/or the like in order for output optics light field 43 to efficiently couple to the downstream optics. Preferably homogenization and/or recombination optics 42 are optimized to minimize loss of light, maximize beam quality of output optics light field 43, minimize a number of optical components in the downstream optics and/or the like.

Homogenization and/or recombination optics 42 operate to combine steered light 16 and unsteered light 17. Homogenization and/or recombination optics 42 may also perform one or more of:

- homogenizing unsteered light 17;
- shaping output optics light field 43; and
- diffusing one or both of steered light 16 and unsteered light 17.

Figure 6:
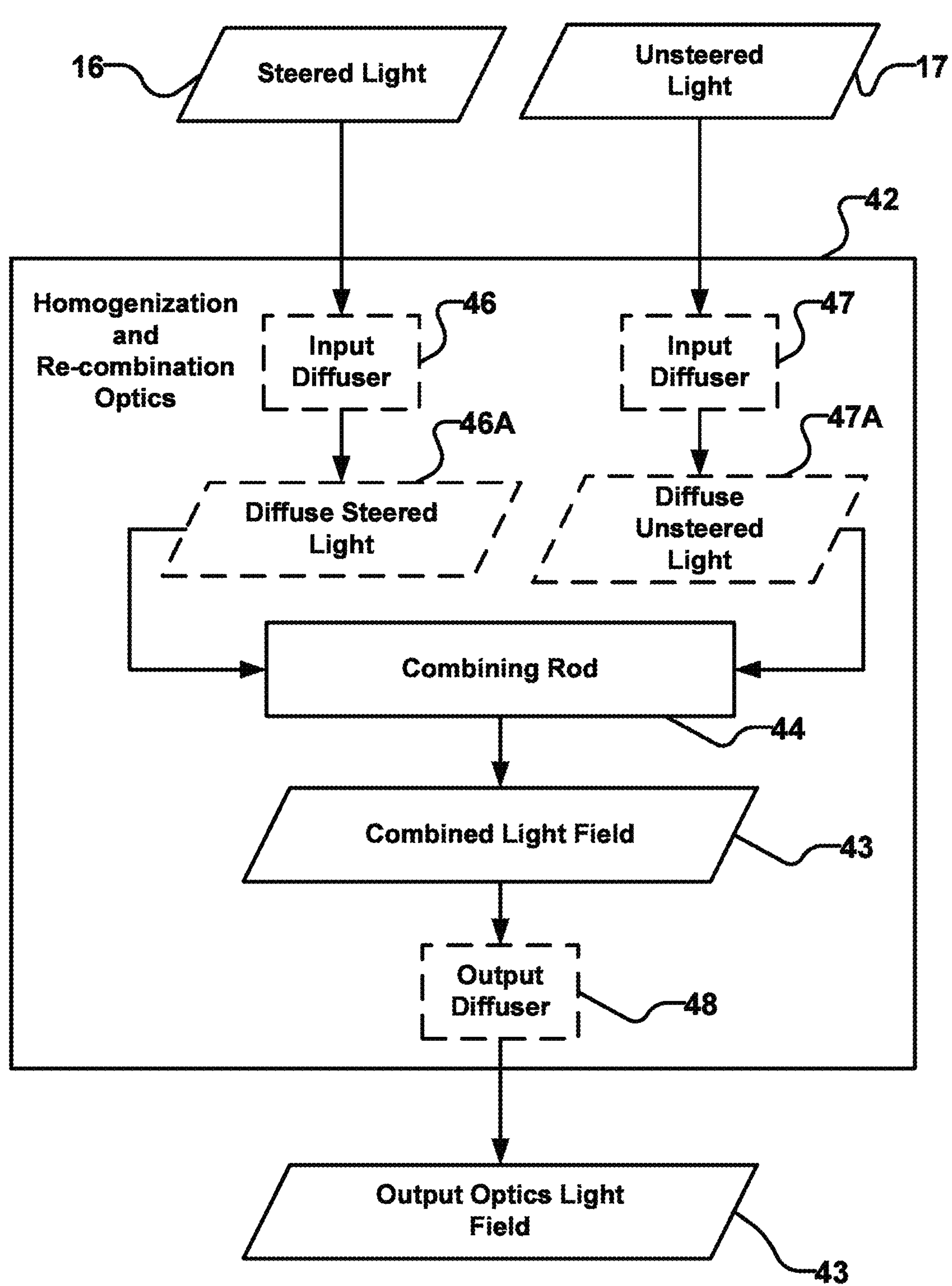
FIG. 6 is a schematic block diagram of homogenization and/or recombination optics according to an example embodiment of the invention.

Example homogenization and/or recombination optics 42 are schematically shown in FIG. 6. In the FIG. 6 embodiment, a combining rod 44 serves to receive and combine steered light 16 and unsteered light 17. Combining rod 44 may additionally serve to homogenize unsteered light 17.

Homogenization and/or recombination optics 42 optionally includes one or more diffusers operative to diffuse steered light 16 and/or unsteered light 17. For example, homogenization and/or recombination optics 42 may include one or more of:

- a diffuser 46 in the optical path of steered light 16 upstream of combining rod 44 to diffuse steered light 46A;
- a diffuser 47 in the optical path of unsteered light 17 upstream of combining rod 44 to diffuse unsteered light 47A; and/or
- a diffuser 48 downstream of combining rod 44 to diffuse combined light field 43.

Including one or more of diffusers 46, 47 and 48 may advantageously assist with removing laser speckle, generate a more uniform light field, generate a desired divergence angle (i.e. a desired divergence angle of light leaving homogenization and/or recombination optics 42) and/or the like.

Figure 7:
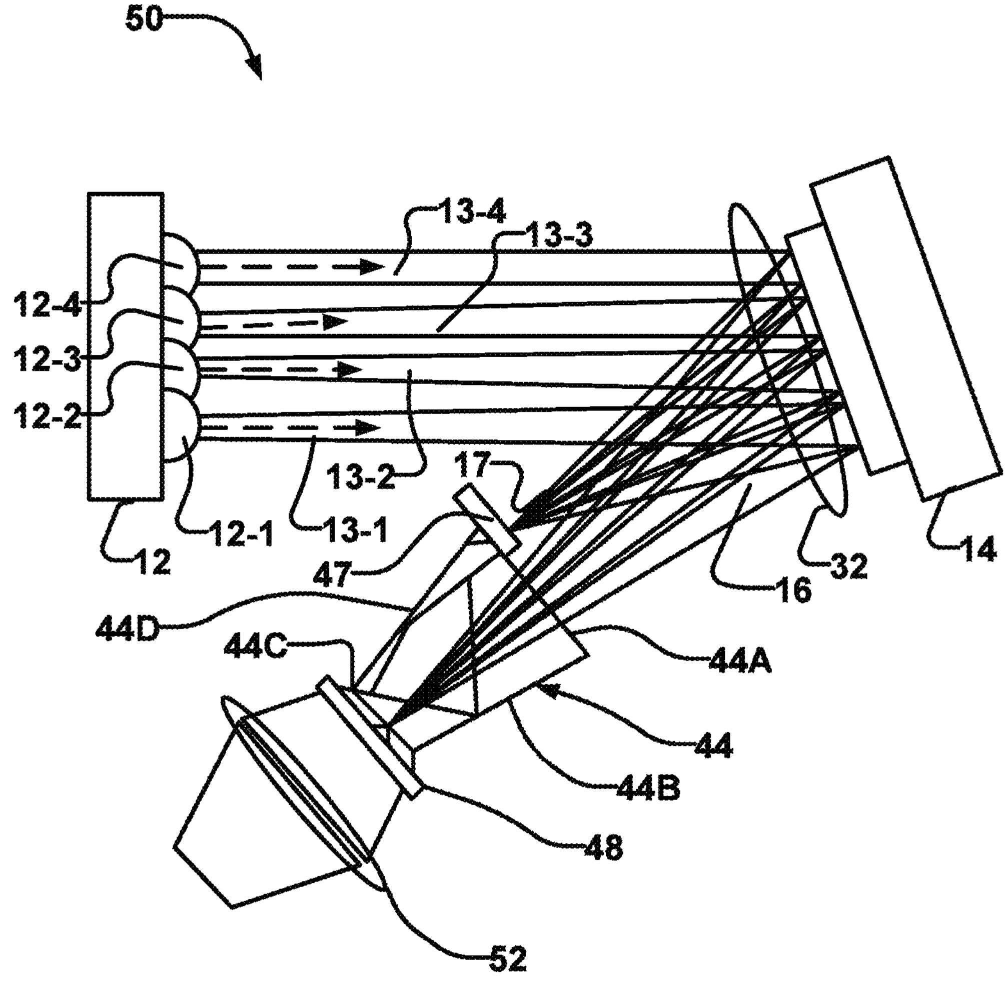
FIG. 7 is a schematic illustration of an optical arrangement according to an example embodiment of the invention.

FIG. 7 schematically shows an optical arrangement 50. Optical arrangement 50 is similar to optical arrangement 30 described elsewhere herein except that optical arrangement 50 comprises homogenization and/or recombination optics 42 which include a combining rod 44. Combining rod 44 is arranged to homogenize unsteered light 17 and to pass steered light 16 through to output light field 43.

Steered light 16 is directed into an end 44A of combining rod 44 (which may be called an “entrance aperture” even if end 44A does not physically comprise a hole or bore), passes through a body 44B of combining rod 44 and exits through a second end 44C of combining rod 44 (which may be called an “exit aperture” even if end 44C does not physically comprise a hole or bore). Steered light 16 is directed toward combining rod 44 in a direction that ensures steered light 16 is not incident on reflecting surfaces of combining rod 44. In this example, steered light 16 is not reflected within combining rod 44. For example, steered light 16 may be directed along a center axis of combining rod 44. In such embodiments, combining rod 44 does not modulate steered light 16. The pattern of higher luminance areas and lower luminance areas caused by steering steered light 16 is preserved at output light field 43.

In contrast to steered light 16, unsteered light 17 is directed into combining rod 44 in a way that causes unsteered light 17 to be internally reflected multiple times within combining rod 44. These reflections tend to homogenize unsteered light 17.

In the embodiment of FIG. 7, combining rod 44 is tapered and lens 32 directs unsteered light 17 to enter near an edge of first end 44A and/or in a direction that is angled toward a side 44D of combining rod 44 such that the unsteered light is internally reflected by side 44D and subsequently is internally reflected several times inside combining rod 44 before exiting at second end 44C.

Unsteered light 17 is optionally diffused by a diffuser 47 before reaching combining rod 44.

Unsteered light 17 is combined with steered light 16 in combining rod 44. The reflections of unsteered light 17 off of the internal surfaces of combining rod 44 varies a propagation axis of unsteered light 17 such that the propagation axis of unsteered light 17 is aligned with a propagation axis of steered light 16.

Combined steered light 16 and unsteered light 17 may optionally be diffused with an output diffuser 48 to produce a desired light field 43 for downstream output. In some embodiments lens 52 focuses combined steered light 16 and unsteered light 17 onto a projector imager or other downstream optics.

In some embodiments combining rod 44 is a passive optical device. Combining rod 44 may be configured to vary optical characteristics such as number of reflections, input and output beam angles and/or the like to generate a more uniform light pattern for unsteered light 17 while directing unsteered light 17 in the same general direction as steered light 16.

Combining rod 44 may be designed to maximize an amount of light that it can receive from phase modulator 14. Maximizing the amount of light that can be received is advantageous as it increases the efficiency of light use of the system. Shapes and/or profiles of the reflecting and/or scattering inner surfaces of combining rod 44 may be designed to provide at least a threshold number of reflections to achieve a desired degree of homogenization of unsteered light 17.

In some embodiments rod 44 comprises two reflective plane surfaces which taper from a larger input face (allowing the separated steered light 16 and unsteered light 17 to be collected) to an output face that is smaller than the input face such that steered light 16 and unsteered light 17 are spatially overlapped.

An exit aperture (e.g. end 44C) of combining rod 44 may be designed to output light with an appropriate range of angles to produce a desirable output light-field. The output angles of the output light may be kept small (e.g. less than 45°) in order to reduce the size of any downstream collecting optics. For example, the exit aperture of combining rod 44 may be designed to output light which is incident on downstream output optics with a range of incidence angles within the acceptance angle of the downstream output optics.

The design of combining rod 44 may be based on factors including:

- a cone with which light enters combining rod 44; and/or
- incident angle of light; and/or
- length of combining rod 44; and/or
- angle of combining rod 44 (e.g. angle at which combining rod 44 tapers); and/or
- output angle of light.

These factors may be optimized to reduce cost and/or size (e.g. by making combining rod 44 shorter) and/or for the quality of the light at an output of combining rod 44 (e.g. symmetric output with relatively low divergence).

In some embodiments combining rod 44 is configured to provide a generally symmetric output (e.g. an axis of the outgoing spread of light exiting combining rod 44 is aligned (e.g. parallel) with an axis (e.g. a center longitudinal axis) of combining rod 44.

If it is desired to make light exiting combining rod 44 less divergent then combining rod 44 may be made longer.

In some embodiments combining rod 44 is configured so that unsteered light 17 that enters combining rod 44 experiences a large number of reflections before exiting combining rod 44 (thus promoting homogenization of unsteered light 17) while having an output angle (e.g. angle θ shown in FIG. 7A) of light at the exit aperture of combining rod 44 that is relatively small. Minimizing the output angle of light at the exit aperture may advantageously facilitate increasing the amount of the output light that is captured by downstream optics. By reducing the output angle of light at the exit aperture smaller (and therefore less expensive) downstream optics (e.g. optics 52) may be used to capture the output light.

Figures 7A, 7B:
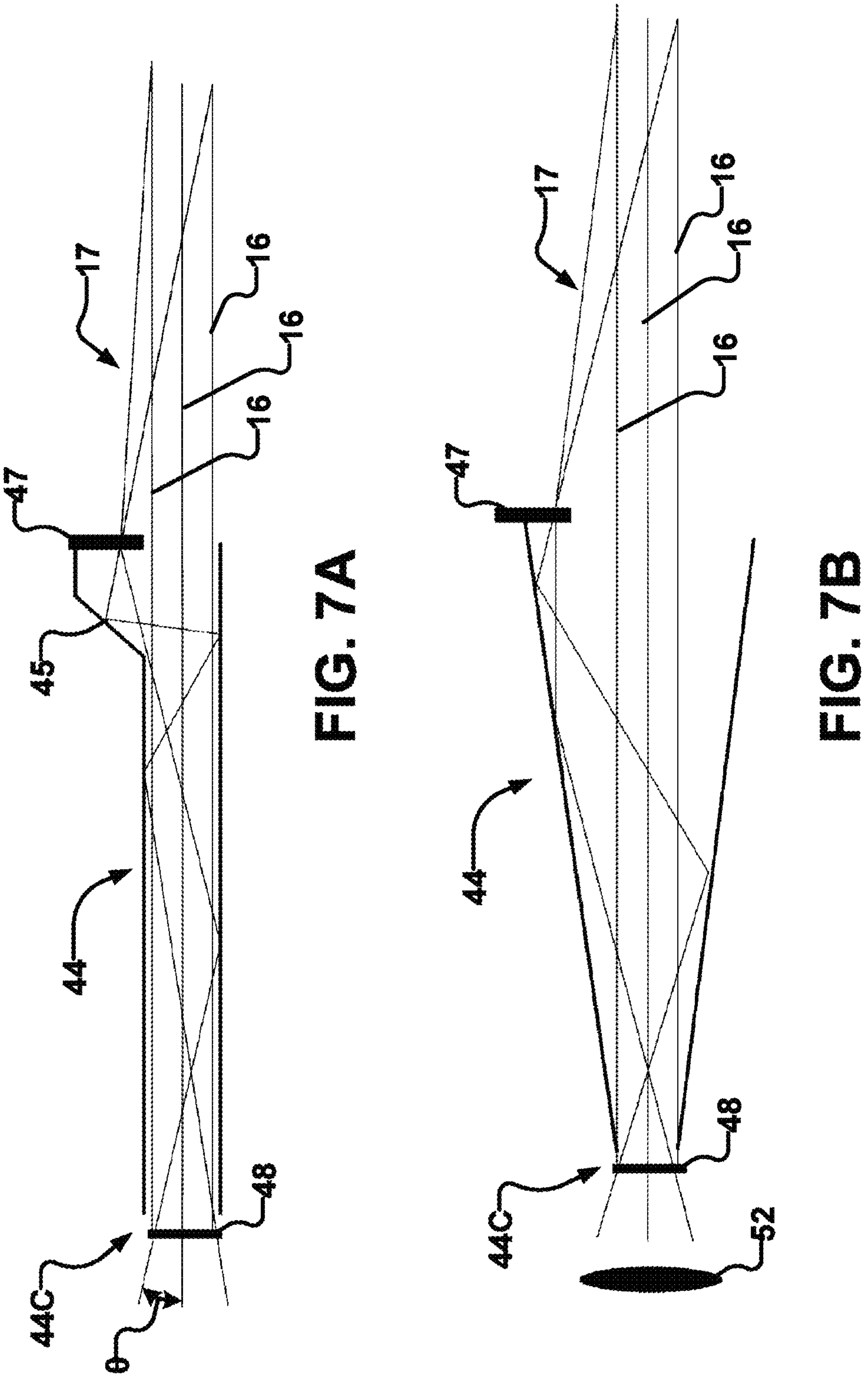
FIG. 7A is a schematic illustration of a combining rod according to an example embodiment of the invention.
FIG. 7B is a schematic illustration of a combining rod according to an example embodiment of the invention.

In some embodiments combining rod 44 comprises a hollow tube (see e.g. FIG. 7A). An inner surface of the wall of combining rod 44 may comprise a reflective material such as a deposited layer of reflective metal or a dielectric coating.

Steered light 16 may be directed in a direction that is parallel with a central longitudinal axis extending through the hollow tube such that combining rod 44 does not significantly affect steered light 16. By contrast, unsteered light 17 may be multiplied, reflected, and/or scattered by the reflective material of the inner surface of the wall. Through the multiple reflection and/or scattering the unsteered light 17 may be homogenized and redirected to exit combining rod 44 combined with steered light 16.

As shown in FIG. 7A, a prism 45 may be optically coupled near first face 44A of combining rod 44. Prism 45 may collect unsteered light 17 and efficiently transmit unsteered light 17 into combining rod 44.

In some embodiments combining rod 44 comprises a solid body of transparent material such as glass, quartz or suitable transparent plastic. In such embodiments unsteered light 17 may be totally internally reflected at surfaces of the solid body and/or the solid body may comprise a light reflective and/or light scattering layer or coating. Unsteered light 17 is directed to enter first end 44A (e.g. the "entrance aperture") of combining rod at an angle so that unsteered light 17 is incident on a side face of combining rod 44 at an acute angle to a vector normal to the side face. Steered light 16 may enter the body 44B of combining rod 44 and pass through combining rod 44 without interacting with side faces of combining rod 44 so that the steered light exits combining rod 44 directly towards the projector imager and/or other downstream optics. In such embodiments combining rod 44 redirects unsteered light 17 to exit combining rod 44 (e.g. at second end 44C or the "exit aperture") propagating in the same general direction as steered light 16. In some embodiments a cross section of such a combing rod 44 is rectangular and has an aspect ratio that matches an aspect ratio of an image to be generated from steered light 16.

In some embodiments combining rod 44 comprises a hollow rectangular tube having at least one tapered face (see e.g. FIG. 7B). The hollow rectangular tube may be tapered towards the downstream optics (i.e. tapered so that a cross sectional area of a bore of the hollow rectangular tube becomes smaller with progress from an entrance aperture of the hollow rectangular tube toward an exit aperture of the hollow rectangular tube). The hollow rectangular tube may have an entrance aperture that is larger than an exit aperture. Having a larger entrance aperture increases the amount of incoming light (e.g. unsteered light 17, steered light 16, etc.) that can be received by combining rod 44. Having a smaller exiting aperture than the opening aperture results in combining rod 44 generating a more concentrated output light field than would be the case if the entrance and exit apertures were the same size.

In some embodiments combining rod 44 is tapered in one plane (e.g. either along the horizontal axis of the combining rod 44 or the vertical axis of combining rod 44). Light may enter combining rod 44 from one or both optical axes. Unsteered light 17 is directed to be incident with a reflective side wall of combining rod 44 and is reflected between a pair of side walls. In some embodiments, combining rod 44 is tapered in both the horizontal and vertical axes. In such embodiments unsteered light 17 may enter combining rod 44 along either axis of combining rod 44. Reflection from multiple horizontal and vertical internal surfaces may increase homogeneity of unsteered light 17.

In some embodiments combining rod 44 is a twisted rod. In such embodiments unsteered light 17 may be reflected from multiple different internal surfaces of the twisted combining rod 44. Reflection from multiple different internal surfaces may increase homogeneity of unsteered light 17. In such a twisted rod the steered light 16 passes through the central axis of the rod unmodified. The cross section of the twisted section is larger than the extent of steered light 16. The range of twists may, for example, be from about a quarter turn (e.g. 90°) to several turns (e.g. 180°, 270°, 360°, etc.) to increase homogeneity of unsteered light 17.

Figure 7C:
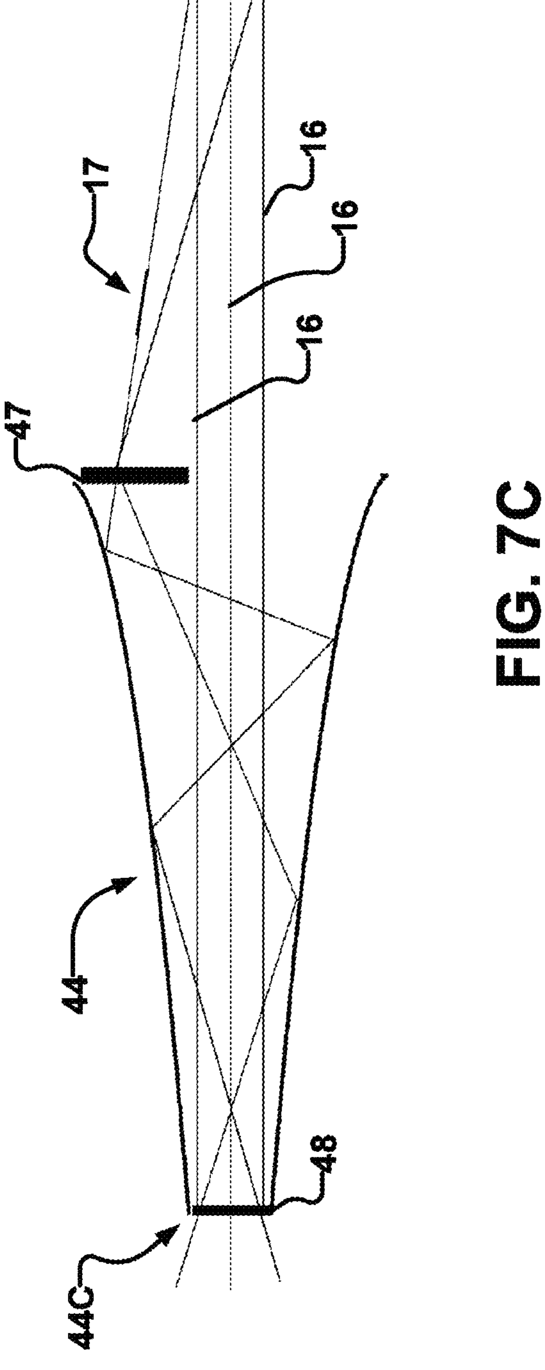
FIG. 7C is a schematic illustration of a combining rod according to an example embodiment of the invention.

In some embodiments the internal wall(s) of combing rod are a custom freeform concave shape (see e.g. FIG. 7C). The custom freeform concave shape may be optimized to generate suitable reflection angles to provide a desired amount of homogeneity of unsteered light 17 while maximizing an amount of incoming light (both steered light 16 and unsteered light 17) that is present at the exit aperture of the combining rod in a suitable range of angles to be received by downstream optics.

In some embodiments additional light (e.g. a "base illumination beam") may be combined with steered light 16 and/or unsteered light 17. Light from the base illumination beam may increase the intensity of light that is incident on a projector imager (or other downstream optics). For example, a base illumination beam may be directed into combining rod 44. The base illumination beam may be combined in combining rod 44 with unsteered light 17. In some embodiments the base illumination beam adds uniformly to the illumination in output light field 43.

In some embodiments the intensity of the base illumination beam is adjustable. The adjustment may, for example, be achieved by one or more of: adjusting an output intensity of one or more light sources that provide the light for the base illumination beam; passing the base illumination beam through an adjustable aperture; pulsing the base illumination beam with a variable duty cycle; passing the base illumination beam through a rotatable polarizer; and modulating the base illumination beam by a light modulator. In some embodiments the base illumination beam is modulated with a reconfigurable separator device (e.g. a variable polarizer or beam splitter). In some embodiments the base illumination beam is modulated with a reconfigurable light illuminator device.

In some embodiments the base illumination beam, steered light 16 and unsteered light 17 are controlled based on characteristics of image data according to a scheme as described in PCT Publication No. WO2015172236A1 entitled OPTIMIZING DRIVE SCHEMES FOR MULTIPLE PROJECTOR SYSTEMS which is hereby incorporated herein by reference for all purposes.

Providing a base illumination beam by way of an optical path that does not include phase modulator 14 can help to display projected images with average luminance greater than that which could be reliably provided using light from phase modulator 14 alone. This is because there is generally a limit to an optical power that a phase modulator 14 can handle. Typical phase modulators absorb some incident light. This can result in heating of the phase modulator. Illuminating such a phase modulator with light that is too intense can heat the phase modulators to temperatures that will cause damage. High intensity light can also degrade phase modulators of certain types by photo-chemical effects. In general, it is desirable to limit the light delivered to a phase modulator 14 to have no more than a maximum practical optical intensity. The maximum optical intensity may be selected based on thermal properties of phase modulator 14, wavelengths of the incident light and/or a desired lifetime of phase modulator 14.

In some embodiments the base illumination beam has an optical power that is greater than that of the light that illuminates phase modulator 14.

In some embodiments some light from beams 13 is used to provide a base illumination beam.

Figures 8, 8A:
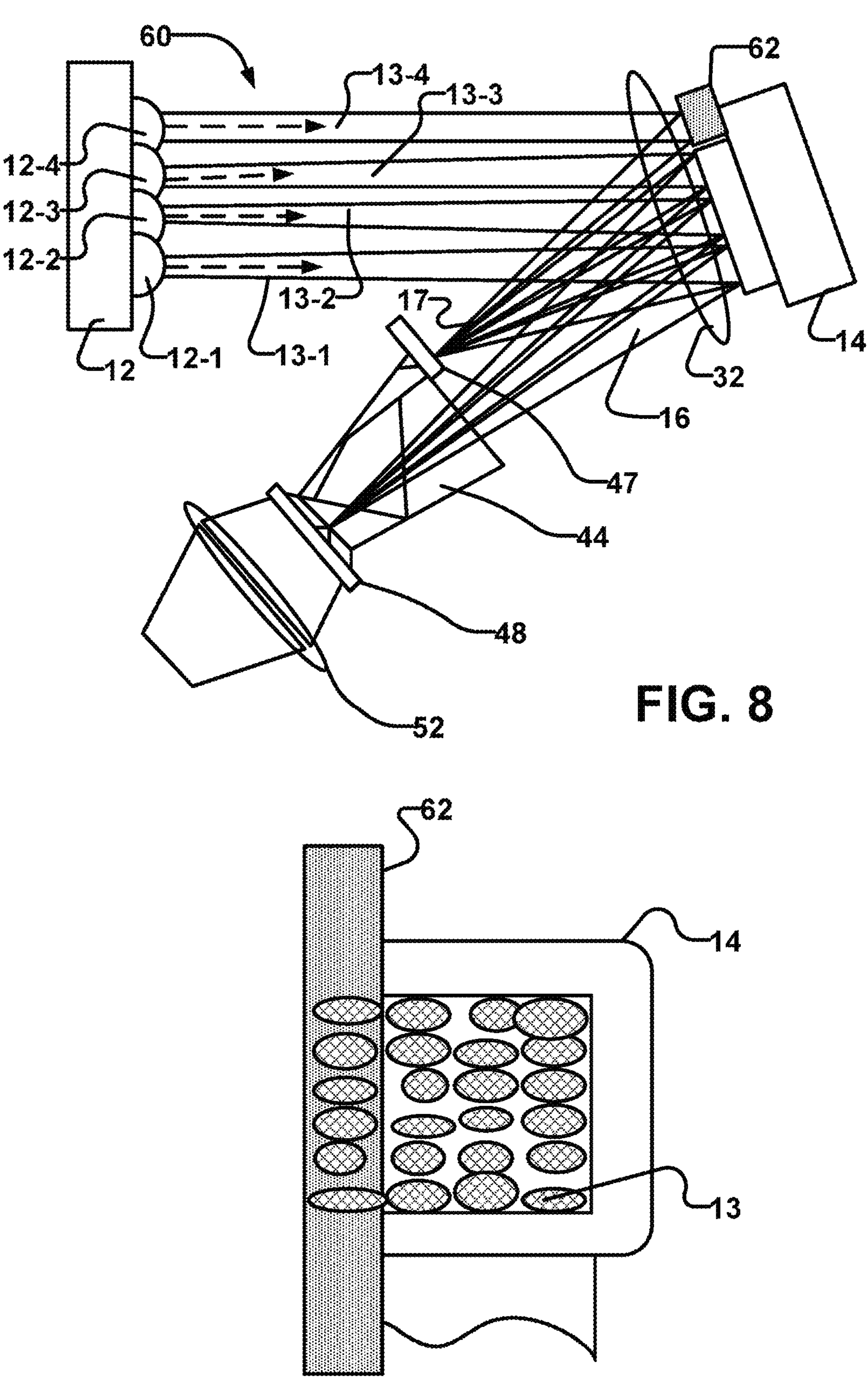
FIG. 8 is a schematic illustration of an optical arrangement according to an example embodiment of the invention.
FIG. 8A is a schematic illustration of a mirror of the FIG. 8 optical arrangement according to an example embodiment of the invention.

FIG. 8 schematically illustrates an example optical arrangement 60. Optical arrangement 60 comprises a mirror 62 (or other light deflector) positioned adjacent phase modulator 14 (see e.g. FIG. 8A). Mirror 62 may be placed in a plane of active surface 14A of phase modulator 14. By placing mirror 62 in the plane of active surface 14A of phase modulator 14, light that is reflected from mirror 62 has the same direction as unsteered light 17 that has been reflected by phase modulator 14. Mirror 62 may be parallel to phase modulator 14. Mirror 62 may be adjacent to one or more edges of phase modulator 14. In some embodiments mirror 62 partially covers active surface 14A of phase modulator 14.

Mirror 62 reflects the light of beams 13 that is incident on mirror 62. The light that is reflected by mirror 62 may be used as base illumination beam 64. Base illumination beam 64 may be directed generally parallel to unsteered light 17.

In some embodiments mirror 62 is replaced with another optical element such as a prism which pulls some light out of beams 13 to use as base illumination beam 64. Such optical element need not necessarily be in the plane of active surface 14A of phase modulator 14. However, base illumination beam 64 and unsteered light 17 preferably have the same direction.

In some embodiments base illumination beam 64 is combined with unsteered light 17 in combining rod 44. Combining rod 44 may combine base light 64, unsteered light 17 and steered light 16 together. In some embodiments a surface of mirror 62 is shaped and/or positioned relative to phase modulator 14 to direct base illumination beam 64 into an optical path that introduces base illumination beam 64 into combining rod 44 at a desired angle or otherwise mixes light from base illumination beam 64 into output light field 43.

Figure 9:
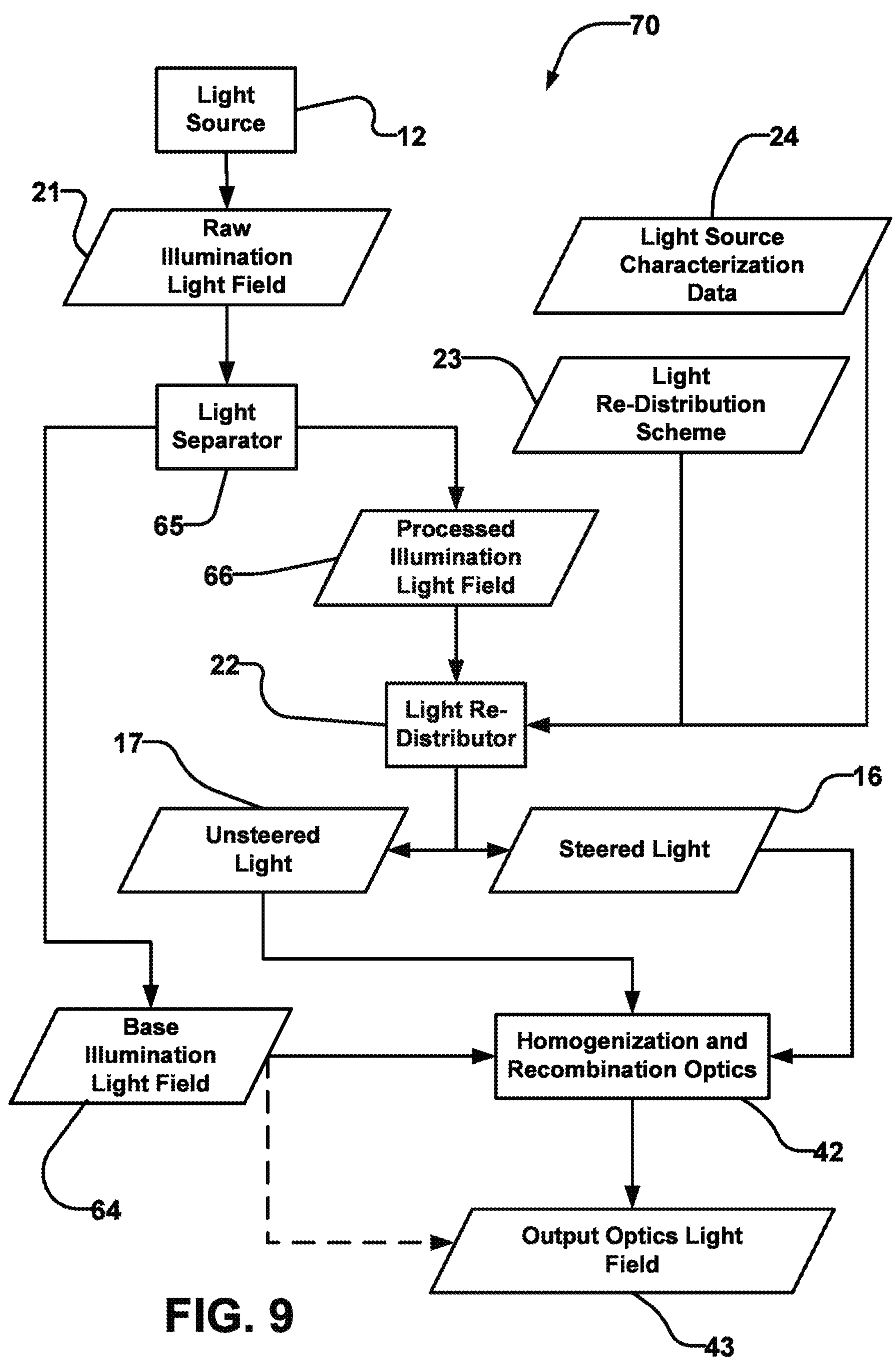
FIG. 9 is a schematic block diagram of an optical arrangement according to an example embodiment of the invention.

FIG. 9 is a block diagram schematically showing an example optical arrangement 70. Optical arrangement 70 is like optical arrangement 40 except that optical arrangement 70 comprises light separator 65. Light separator 65 receives raw illumination light field 21 (e.g. beams 13) and splits raw illumination light field 21 into base illumination beam 64 and processed illumination light field 66. Processed illumination light field 66 illuminates light re-distributor 22. Homogenization and recombination optics 42 combine base light 64, steered light 16 and unsteered light 17.

Light separator 65 may, for example, be a mirror arranged to intercept part of raw illumination light field 21. In some embodiments light separator 65 is a semi-reflective mirror or prism. In some embodiments light separator 65 is a reflective polarizer redirecting light of one polarization state to base illumination 64 and light of the other polarization state to processed illumination light field 66.

In some embodiments base illumination beam 64 originates from one or more separate light sources 67. In some such embodiments light source(s) 67 are arranged to emit base illumination beam 64 directly toward homogenization and recombination optics 42. This, for example, may facilitate using a type of light source for light source 67 that is different from light source 12 (e.g. light source 67 may be less expensive, have a broader light spectrum, or be otherwise unsuitable for use as light source 12, etc.).

Figure 10:
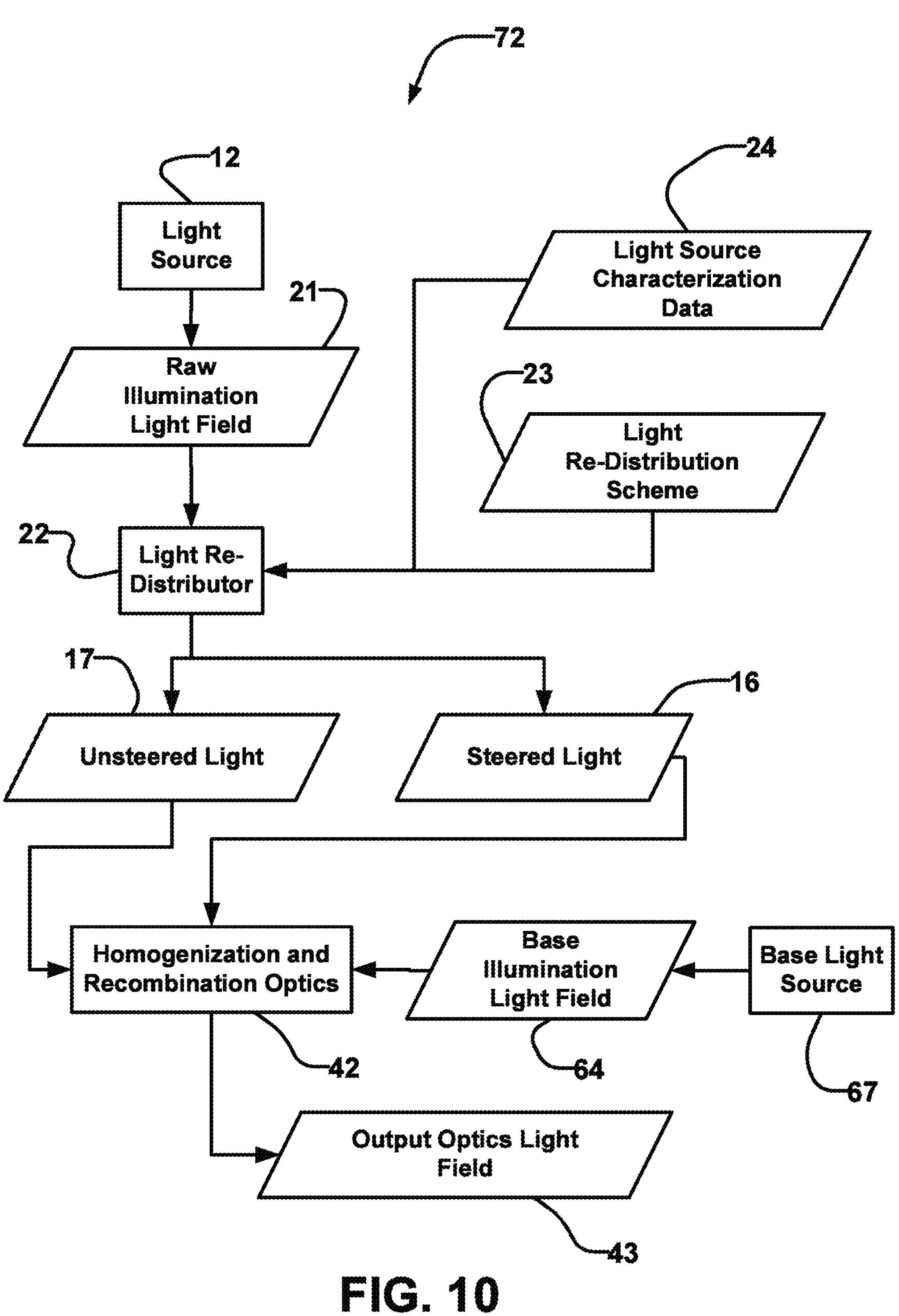
FIG. 10 is a schematic block diagram of an optical arrangement according to an example embodiment of the invention.

FIG. 10 is a block diagram schematically showing an optical arrangement 72. Optical arrangement 72 is like optical arrangement 70. However, optical arrangement 72 comprises light source 67 for generating base illumination beam 64. Light source 67 may, for example, be a LED or laser light source.

In some embodiments patch lenses 15A may correct for small misalignments of optical components of a light steering system. By taking advantage of this possibility, the requirement to precisely align optical components may be relaxed. This can result in significant reductions in manufacturing and/or maintenance costs. Furthermore, an apparatus adapted to compensate for changes in alignment of optical components by adjusting optical forms of patch lenses 15A may have a structure that is lighter and less expensive to manufacture than the massive rigid structure that might otherwise be needed to maintain precise alignment of optical components over the lifetime of an apparatus.

Patch lenses 15A that are effective to achieve one or more of:

- compensation for misalignments of optical components;
- compensation for deviations from ideal of beams 13; and/or
- compensation for differences in position of patches 15 on phase modulator 14;

may be determined by analyzing a light field produced by a system as described herein. For example, an automated imaging system in combination with specific computer algorithms may generate optical forms for patch lenses 15A which provide corrections as described above. Such images may be captured in calibration stages during manufacturing of a projector system or while a projector system is in use. Such corrections may permit overall sharper images to be projected by the projector system.

Figure 11:
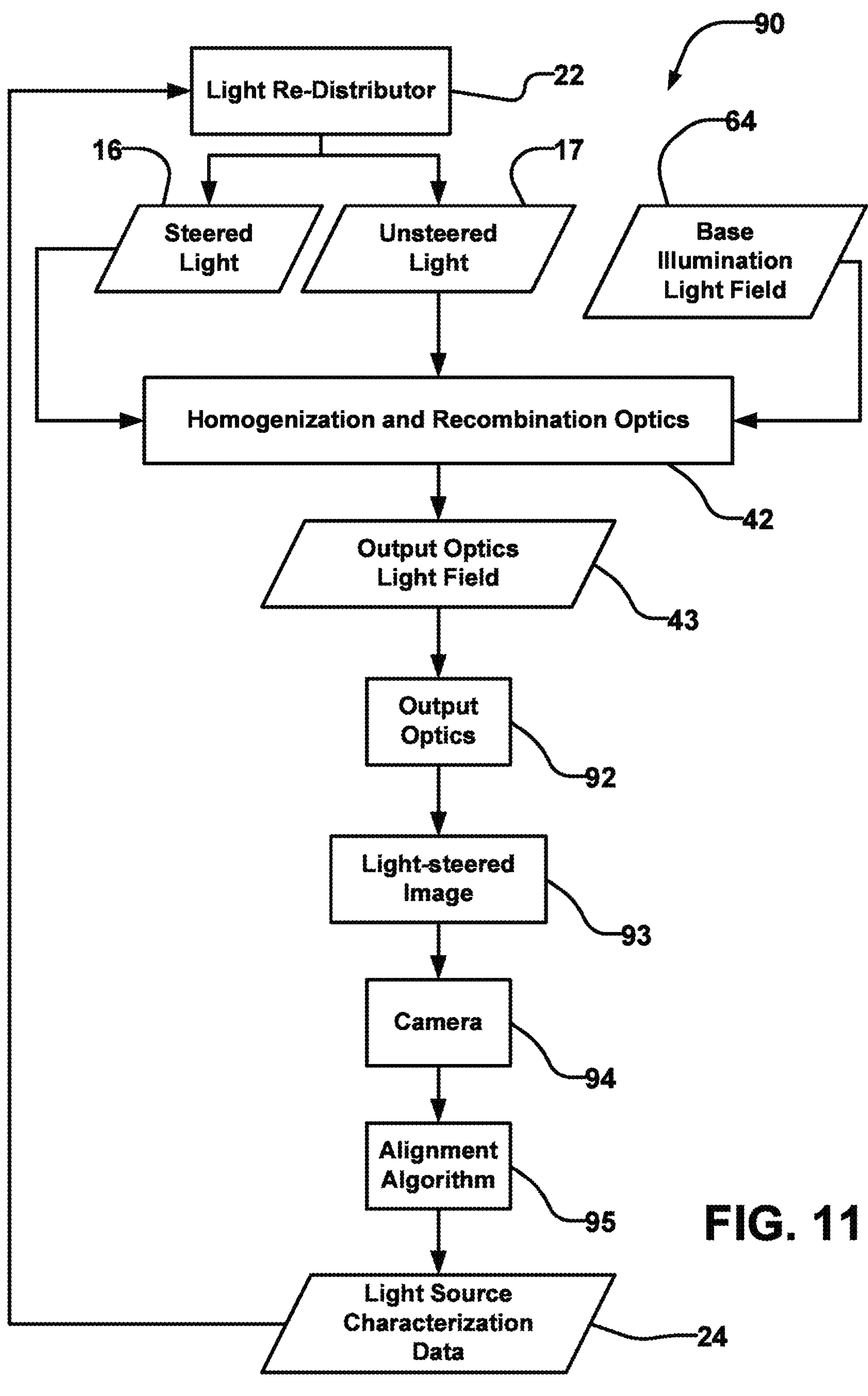
FIG. 11 is a schematic block diagram of an optical element alignment system according to an example embodiment of the invention.

FIG. 11 is a block diagram schematically showing an alignment system 90. Output light field 43 illuminates output optics 92 (e.g. a projector imager) to generate image 93. Output light field 43 may be generated using an optical arrangement as described elsewhere herein.

Output optics 92 may comprise an amplitude modulator and associated projection optics that form a final image 93 on, for example, a screen. In some embodiments output optics 92 comprise a relay system which produces an intermediate light-steered image. The intermediate light-steered image may, for example, be monitored with an automated imaging system.

Features of light-steered image 93 (e.g. sharpness, intensity distribution, the presence of certain artifacts, etc.) are dependent on the optical forms of patch lenses 15A.

System 90 comprises a sensor 94 (e.g. a camera) arranged to collect images of image 93 (and/or the intermediate light steered image). The images are processed to measure one or more characteristics of image 93. Captured images and/or data corresponding to image 93 are provided as input to a control system (e.g. control system 25) or computer executing an alignment algorithm 95. Alignment algorithm 95 processes the captured data to measure characteristics of light used to generate image 93 and determines optical forms for patch lenses 15A which would improve the quality of image 93. Alignment algorithm 95 outputs optical forms for patch lenses 15A which correct for one or more of the above-described issues. Such optical forms may be provided to a control system 25 as part of light source characterization data 24. The optical forms of patch lenses 15A may be superposed with phase shifts for light steering as part of light re-distributor 22 as described elsewhere herein.

In some embodiments, special light steering components are applied to corresponding regions of the phase modulator while displaying image 93. The special "calibration light steering phase patterns" may be selected to assist in differentiating light originating from different beams 13 and/or to generate light patterns in image 93 ("test patterns") that make evident the degree to which a corresponding patch lens is correcting deviations from ideal of the corresponding beam 13. In some embodiments the calibration light steering phase patterns are stored in a data store accessible to control system 25. In some embodiments the calibration light steering phase patterns include sequences of different calibration light steering phase patterns to be applied to different regions of the phase modulator over the course of a calibration routine.

Figure 12:
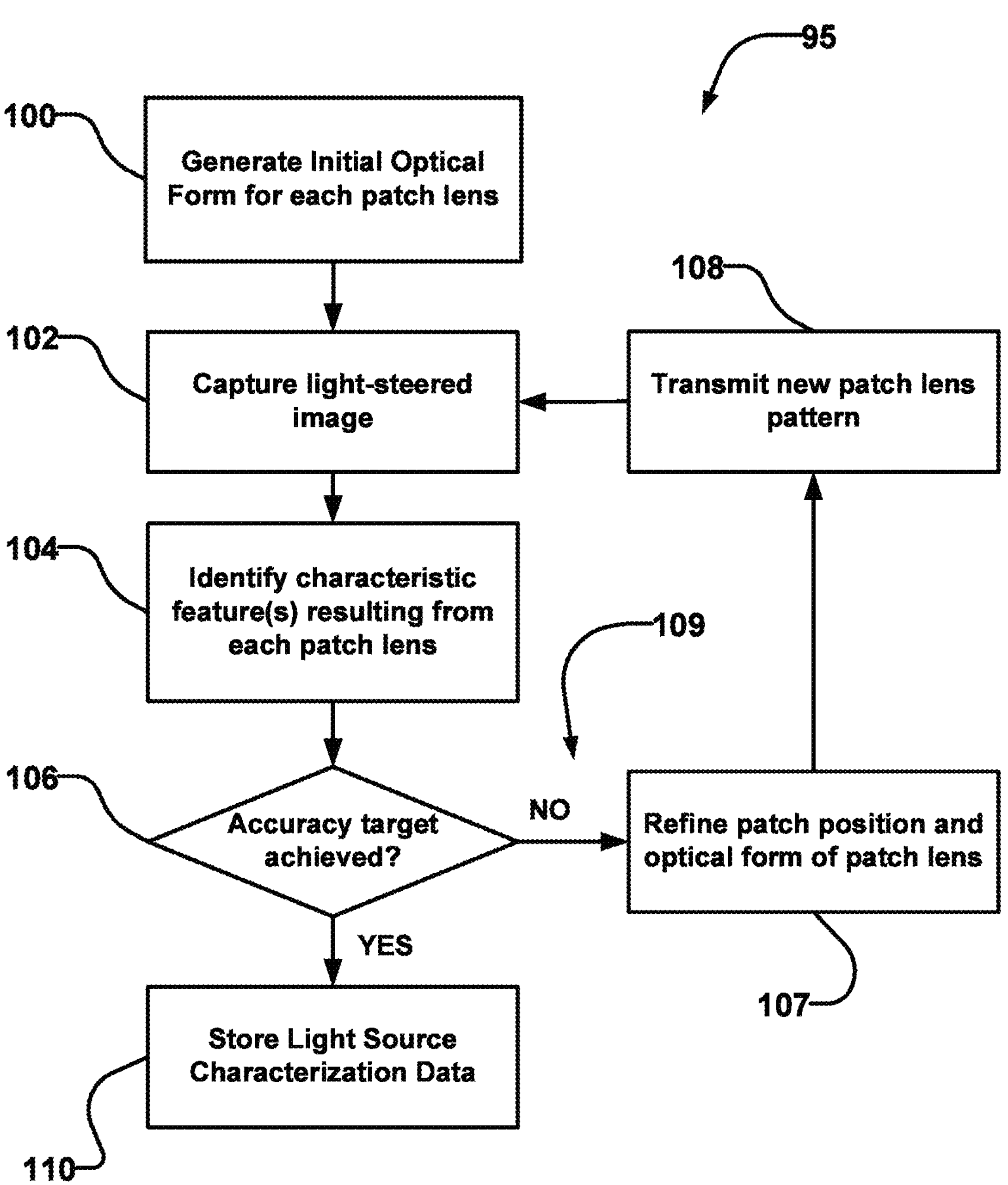
FIG. 12 is a block diagram showing a method according to an example embodiment of the invention.

FIG. 12 is a block diagram showing steps in an example alignment algorithm 95. In block 100, method 95 generates an initial optical form for each patch lens 15A. An initial optical form may be based on information characterizing a specific light source 12 (e.g. model no., number of emitters, type of emitters, power level, wavelength, etc.) and/or information characterizing phase modulator 14 (e.g. number and size of pixels, locations of regions 15, aspect ratio, etc.).

In block 102 an image of a generated pattern 93 (and/or the intermediate light steered image described elsewhere herein) is captured (e.g. using camera 94). Pattern 93 may, for example, be a calibration image which includes specific light steering components for beams 13. Since patch lenses 15A correspond to individual light beams 13, it is generally desirable to be able to distinguish between parts of pattern 93 which originate from different beams 13. There are a variety of ways that this can be achieved including:

- turning beams 13 on one at a time;
- turning beams 13 off one at a time;
- varying intensities of one or more of beams 13 in known ways (e.g. at known frequencies);
- by changing different beam properties and/or the like;
- applying different light steering components to different regions of phase modulator 14 that correspond to different light beams 13;
- varying a patch lens 15A or another component used to generate a phase pattern applied to the region 15 of phase modulator 14 corresponding to the beam 13 (e.g. to cause parts of pattern 93 originating from the light of the beam 13 to move or be distorted or be modified in a known way). The varying may be periodic. Different patch lenses may be identified by varying optical forms of each patch lens to vary beam patterns at different rates and/or in different directions.

Characteristic feature(s) of image 93 are identified in block 104. Characteristic features include position, shape, intensity and uniformity of parts of pattern 93.

The characteristic features identified in block 104 are compared to reference features in block 106. Patch lenses 15A are adjusted in loop 109 until the characteristic features detected in block 104 match the corresponding reference features to a desired level of accuracy. When the characteristic features match the reference features, the light source characterization data (i.e. the optical forms of the patch lenses) is stored in block 110 and/or communicated to phase modulator 14.

If the desired level of accuracy has not been reached, the optical forms and/or positions of the patch lenses is updated in block 107. The desired level of accuracy typically depends on an image quality that is required by a specific market segment. For example, a desired level of accuracy may be higher for a large professional-grade cinema system than for a compact home entertainment projector.

Patch lenses may be characterized by factors such as:

- focal length in the x direction;
- focal length in the y direction;
- location of the optical center of the lens;
- lens tilt in the x direction;
- lens tilt in the y direction;
- size of the lens; and/or
- position of the lens area within a region 15 of phase modulator 14.

In block 107 one or more of the above factors corresponding to a patch lens may be varied. Typically the one or more factors are incrementally varied to optimize the patch lens. Each iteration preferably yields a more desirable point spread function (PSF) shape and size. The search for optimized parameters for a patch lens may be a brute force search if there are few enough parameters or a gradient search or use a simulated annealing approach or may address parameters in a sequence.

In some embodiments parameters for a patch lens are optimized by: starting with a standard patch lens configuration (e.g. a spherical lens having a selected focal length), moving a center of the patch lens to find a best center location, optionally adjusting a tilt of the patch lens and subsequently adjusting one or both of lens focal length and size.

The updated optical forms are communicated to phase modulator 14 in block 108 and method 95 returns to block 102 where a new image of pattern 93 is captured. The new image is generated using the updated optical forms and/or positions of patch lenses 15A. Loop 109 will repeat until the desired level of accuracy has been reached.

In some embodiments each patch lens is determined sequentially (i.e. one patch lens at a time).

In some embodiments different patch lenses are determined concurrently (i.e. two or more patch lenses are determined concurrently). This increases efficiency and reduces computation time. Each patch lens affects only light from the light beam 13 incident on the specific patch lens and therefore only the light distribution on-screen that is due to that patch. By identifying which patch lens corresponds to which spot on-screen it is possible to simultaneously vary parameters of different ones of the patch lenses. Identifying which patch lens corresponds to which spot on-screen may for example be done by updating different patch lenses in different directions or at different rates and correlating the changes to changes observed in the on-screen pattern 93.

Figure 13:
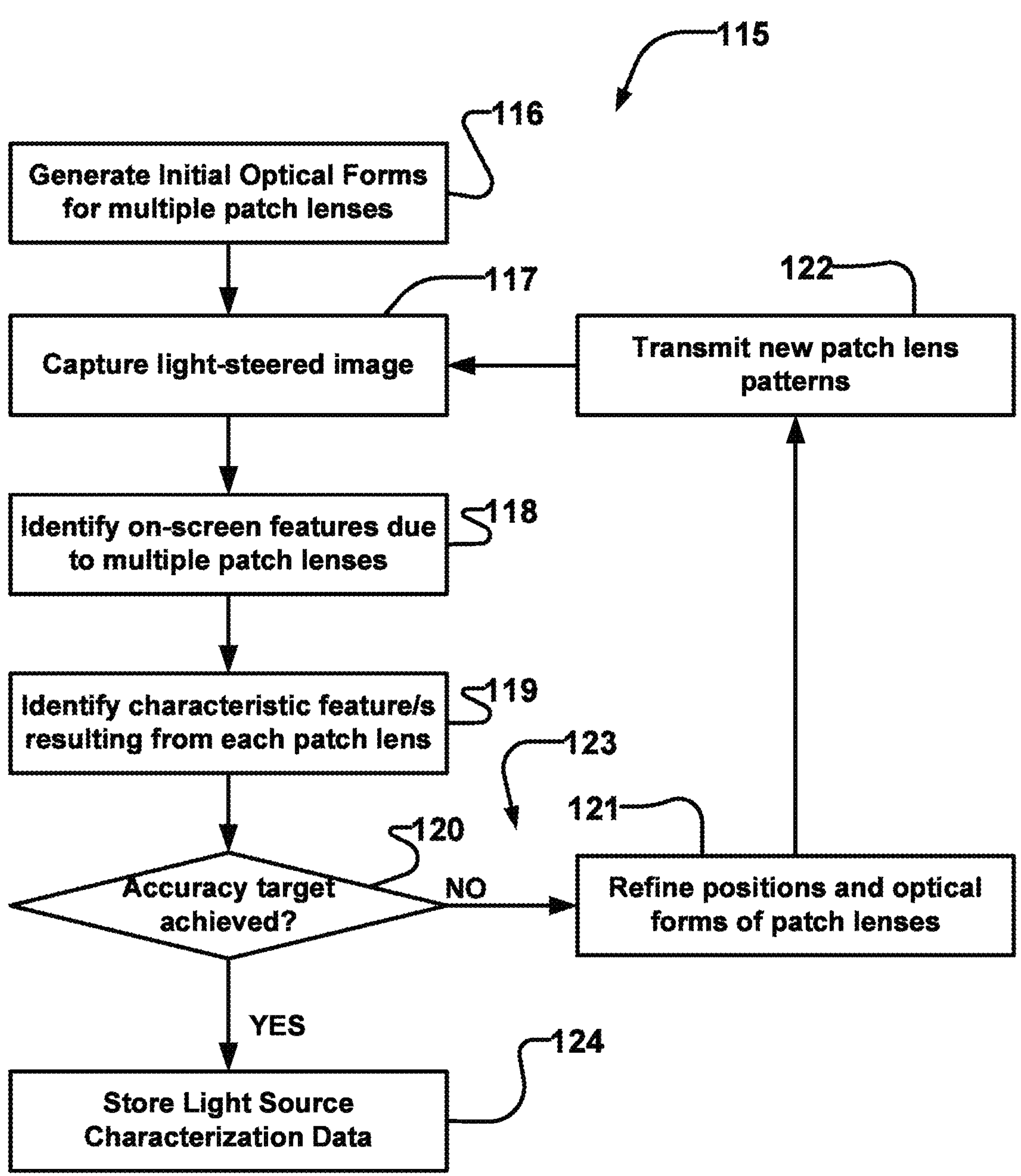
FIG. 13 is a block diagram showing a method according to an example embodiment of the invention.

FIG. 13 schematically shows an example method 115 for improving alignment of optical elements within a projector system. Method 115 is similar to method 95 except that method 115 may optimize multiple patch lenses simultaneously which may increase time efficiency.

Method 115 determines which features of pattern 93 correspond to each patch lens 15A, for example by using any of the approaches described above.

In block 116 initial optical forms for a plurality of patch lenses (e.g. patch lenses 15A) are generated. The initial optical forms of the patch lenses may be determined from known optical parameters of the product design. For example, the optical forms may be determined assuming an initial position of illumination patches and designed focal lengths.

An image of pattern 93 is captured in block 117 (e.g. using camera 94). In block 118, the captured image data is processed to identify features which correspond to individual ones of patch lenses 15A or sets of the patch lenses. In block 119 identified features are matched to the corresponding patch lens 15A.

As described elsewhere herein identifying which patch lens corresponds to which spot on-screen may for example be done by updating different patch lenses in different directions or at different rates and correlating the changes to changes observed in the on-screen image. In some embodiments a single patch lens is varied and corresponding changes are observed.

A single patch lens may potentially direct light to any point on the screen. Therefore it may be necessary to identify which on screen features (across an entire screen) correspond to which patch lens.

The identified features are compared to corresponding reference features. Block 120 determines whether the identified features match the corresponding reference features to a threshold accuracy. If the threshold accuracy target is reached, optical forms for the patch lenses is stored as part of block 124. If the threshold accuracy target is not reached the positions and/or optical forms of the patch lenses are refined in block 121. New optical forms for the patch lenses are transmitted (e.g. communicated to phase modulator 14) in block 122 and method 115 returns to block 117 where new data of image 93 generated using the new patch lenses is captured by camera 94. Loop 123 repeats until the desired threshold accuracy is reached.

In processing images of image 93, the location and optical characteristics of camera 94 may be taken into consideration. Camera 94 may, for example:

- be mounted at a known location relative to a projector apparatus;
- view a screen on which image 93 is projected through the projection lens used to project image 93;
- be part of another device, such as a mobile phone that is in data communication with a system as described herein.

In some embodiments light source 12 may comprise emitters which emit multi-colour light (e.g. red, green and blue). In such embodiments each patch lens 15A may be configured based on the wavelength of the corresponding incident beam 13. This permits a single phase modulator 14 to be used to steer beams of light which have different wavelengths. Typically, an arrangement of light emitters in source 12 is known or can be characterized thereby permitting individual patch lenses 15A to be generated which are wavelength specific.

Figure 14:
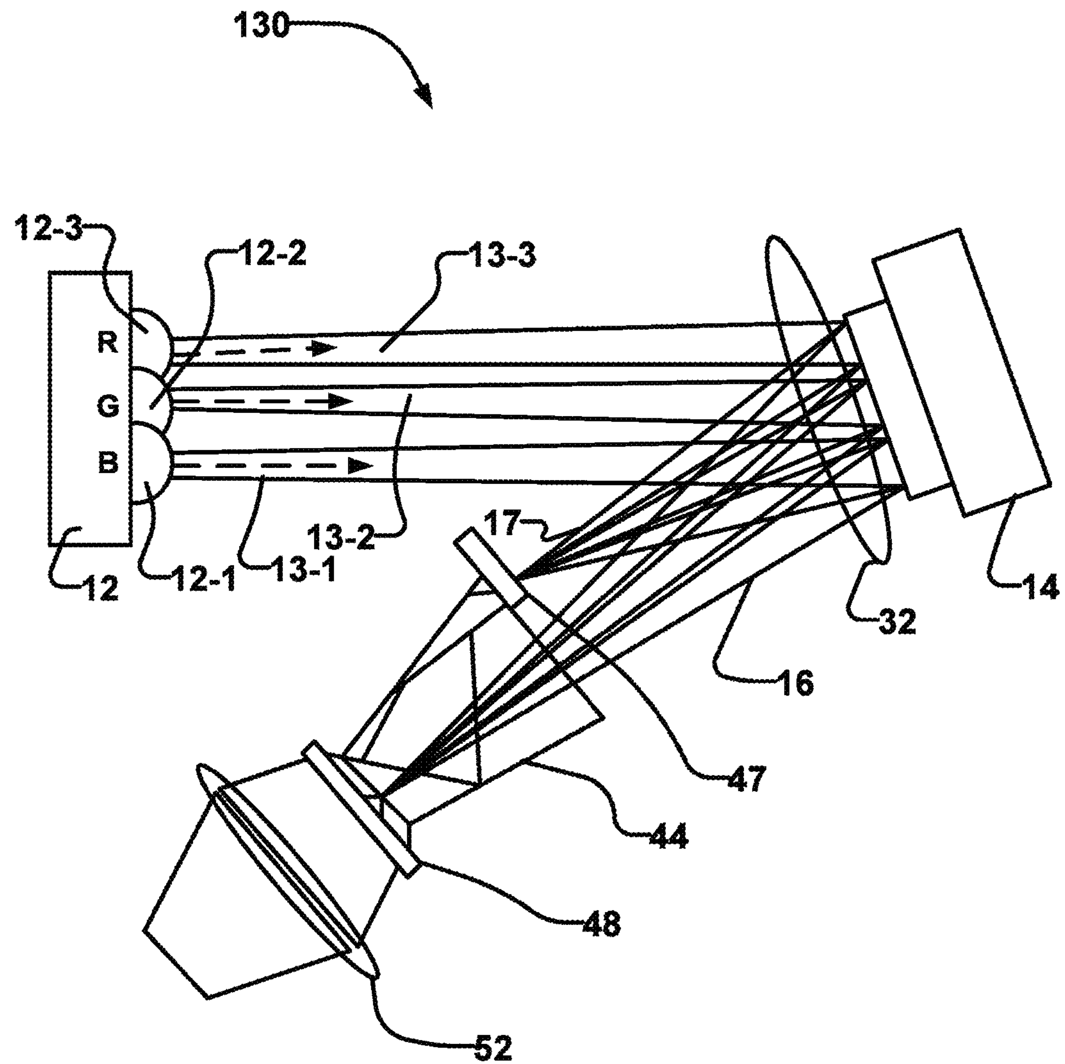
FIG. 14 is a schematic illustration of an optical arrangement according to an example embodiment of the invention.

FIG. 14 schematically shows an example optical arrangement 130 comprising multi-emitter light source 12 which has light emitters which generate light of different wavelengths (e.g. red, green and blue). Optical arrangement 130 is the same as optical arrangement 50 except that multi-emitter light source 12 comprises light emitters of multiple wavelengths. In such embodiments phase modulator 14 displays patch lenses 15A which are wavelength specific such that light emitted by source 12 can be steered as desired using a single phase modulator 14 (e.g. as opposed to having to use multiple wavelength specific phase modulators 14).

In some embodiments (e.g. see FIG. 14) unsteered light of each of the different wavelengths (e.g. unsteered red light, unsteered green light and unsteered blue light) is directed to a homogenizing input of a combining rod 44. In such embodiments combining rod 44 homogenizes the unsteered light of the different wavelengths in both direction of the light, mixes the unsteered light of the different wavelengths (or colors) of light together (e.g. mixes red, green and blue light into white light) and combines the steered light with the homogenized colour-mixed unsteered light. This may advantageously reduce the number of downstream optical elements that are required (e.g. eliminates the need for a color combining optical element).

The unsteered light (and steered light of the different wavelengths) may be directed to the input of a combining rod 44 as described elsewhere herein. Combining rod 44 may be any combining rod described elsewhere herein.

In some embodiments one or more alternative light sources of different wavelengths (e.g. a red light source, a green light source and/or a blue light source) may be positioned to emit light into combining rod 44 to increase intensity of unsteered light 17.

The light emitters of multiple wavelengths of multi-emitter light source 12 may be arranged in any manner. In some embodiments the light emitters are randomly arranged. In some embodiments the light emitters are arranged in rows or columns based on wavelength (e.g. a row or column of red emitters, a row or column of green emitters and a row or column of blue emitters).

Figure 15:
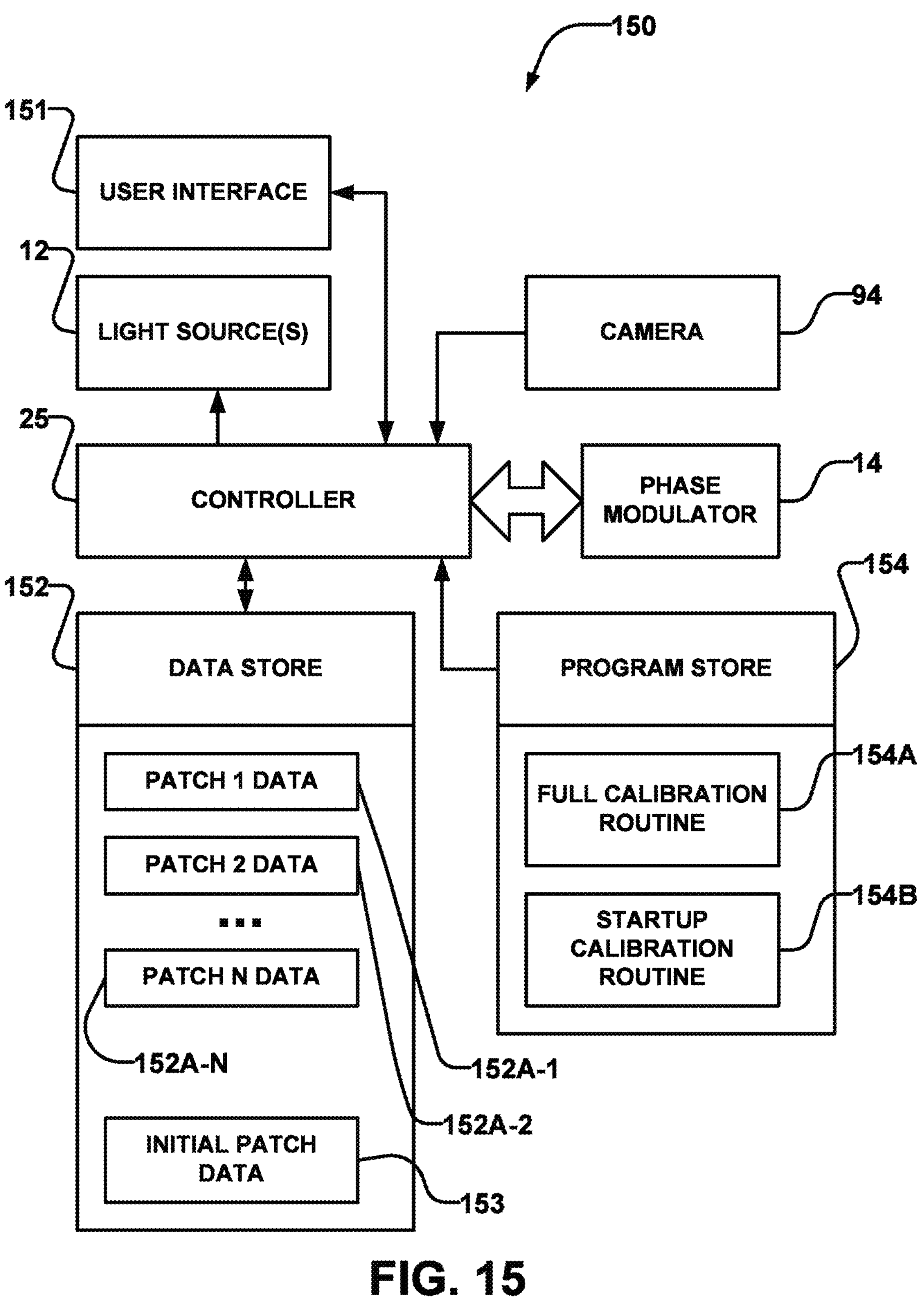
FIG. 15 is a block diagram illustrating an example control system.

FIG. 15 is a block diagram illustrating an example control system 150 of a type that may be provided in apparatus as described herein.

Controller 25 is configured to control light sources 12 and phase modulator 14. As described elsewhere herein, controller 25 may receive input from camera 94. In some embodiments phase modulator 14 provides feedback to controller 25.

Controller 25 may receive user input from a user interface 151. Controller 25 may also provide information about the apparatus described herein to a user via interface 151.

Data related to each patch lens to be displayed by phase modulator 14 may be stored in a data store 152. Data store 152 may, for example, comprise one data entry for each optical form corresponding to a patch lens to be displayed by phase modulator 14 (e.g. data entries 152A-1, 152A-2, . . . , 152A-N).

In some embodiments data store 152 comprises initial patch data 153. Initial patch data 153 may for example comprise initial optical forms of patch lenses to be display by phase modulator 14 prior to the patch lenses being optimized using any method described elsewhere herein.

Calibration routines to be performed by controller 25 and the apparatus described herein may be stored in a program store 154. For example, program store 154 may comprise a full calibration routine 154A which comprises machine executable instructions to be executed by controller 25 and configured to calibrate a brand new apparatus when it is manufactured. Additionally, or alternatively, program store 154 may comprise a startup calibration routine 154B which comprises machine executable instructions to be executed by controller 25 and configured to calibrate an apparatus described herein once the apparatus is powered on (e.g. to calibrate any misalignments that may have occurred between power-on cycles).

The systems and methods described herein are not limited to use in a single type of projector system. In some cases the systems and methods described herein are incorporated into a professional grade commercial cinema system for use in movie theaters. In some cases the systems and methods described herein are incorporated into consumer projection systems for e.g. home use.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention (e.g. control systems, calibration systems, etc.) may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Where a component (e.g. a phase modulator, light source, combining rod, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

The invention has a number of non-limiting aspects. Non-limiting aspects of the invention comprise:

1. A projection system comprising:

one or more light sources operable to emit a plurality of light beams;

a phase modulator comprising a two-dimensional array of pixels, the pixels controllable to retard phase of light incident on the pixels by variable amounts, the phase modulator having an active area in an optical path of the plurality of light beams, each of the plurality of light beams incident on the active area of the phase modulator in a corresponding one of a plurality of distinct regions of the active area of the phase modulator;

a controller configured to set the pixels of each of the distinct regions of the phase modulator to display an optical form for a patch lens corresponding to the distinct region, the patch lens is configured to correct for non-uniformities present in the corresponding one of the beams of light.

2. The projector according to aspect 1 wherein the distinct regions are arranged in an array comprising a plurality of rows and a plurality of columns.

3. The projector according to aspect 1 or 2 wherein the light source comprises a multi-emitter light source comprising at least two rows and two columns of light emitters.

4. The projector according to any of aspects 1 to 3 wherein the controller is configured to set the pixels of each of the distinct regions of the phase modulator to display a light steering phase pattern combined with the optical form for the corresponding patch lens.

5. The projector according to any of aspects 1 to 4 wherein the optical form for the patch lens corresponding to the distinct region is at least partially based on measured deviations from ideal of the corresponding light beam.

6. The projector according to any of aspects 1 to 5 wherein the optical form for the patch lens corresponding to the distinct region is at least partially based on measured deviations from ideal of a light field produced at an image plane after the corresponding light beam has interacted with the phase modulator.

7. The projector according to any of aspects 1 to 6 wherein the corrected non-uniformities comprise at least one of pointing parallelism, collimation and intensity distribution.

8. The projector according to any of aspects 1 to 7 wherein the displayed optical forms correspond to optical forms for spherical lenses.

9. The projector according to any of aspects 1 to 8 wherein adjacent patch lenses abut one another.

10. The projector according to any of aspects 1 to 9 wherein an entire active area of the two-dimensional array of pixels of the phase modulator is covered by patch lenses.

11. The projector according to any of aspects 1 to 10 wherein the optical form of each patch lens is generated independently.

12. The projector according to any of aspects 1 to 11 wherein the optical form of each patch lens is generated by the controller configured to execute an optimization process.

13. The projector according to aspect 12 wherein the optimization process comprises iteratively varying phase shifts of the pixels of the corresponding patch lens until one or more observed characteristics of a corresponding output beam indicate that the patch lens is suitably correcting for deviations from ideal of the light beam.

14. The projector according to aspect 12 or 13 wherein the optimization process is executed sequentially for different ones of the plurality of patch lenses.

15. The projector according to aspect 12 or 13 wherein the optimization process is executed in parallel for different ones of the plurality of patch lenses.

16. The projector according to any of aspects 12 to 15 wherein the optimization process comprises performing simulated annealing to find phase shifts for the pixels in the region which will make up the phase pattern for the corresponding patch lens.

17. The projector according to any of aspects 1 to 16 wherein the optical form for each of the patch lenses specifies at least one of focal length, optical centre shift, parameterized astigmatism and tilt of the corresponding patch lens.

18. The projector according to any of aspects 1 to 17 wherein at least one of the distinct regions is divided into a plurality of sub regions and the controller is configured to set the pixels of each of the sub regions to display an optical form corresponding to the sub region.

19. The projector according to any of aspects 1 to 18 wherein different parts of a single light beam illuminate two or more sub regions of a corresponding distinct region of the phase modulator.

20. The projector according to any of aspects 1 to 19 wherein at least one of the optical forms corresponds to a plurality of lenses superposed on one another.

21. The projector according to any of aspects 1 to 20 wherein at least one of the light beams extends over a plurality of the distinct regions.

22. The projector according to any of aspects 1 to 21 wherein one or more of the optical forms is respectively varied in real time to account for varying characteristics of a corresponding one of the light beams.

23. The projector according to any of aspects 1 to 22 wherein the optical form applied to each of the light beams further comprises a light steering component to steer light.

24. The projector according to aspect 23 wherein the corresponding patch lens and the corresponding light steering component are superposed.

25. The projector according to aspect 23 or 24 wherein the light steering components applied to different ones of the light beams are the same.

26. The projector according to aspect 24 or 25 wherein the light steering components applied to different light beams are different.

27. The projector according to any of aspects 23 to 26 wherein the light steering components are configured to steer the light beams to converge at a plurality of different points.

28. The projector according to any of aspects 23 to 27 wherein the controller controls each of the distinct regions of the phase modulator individually to display a pattern of phase shifts which steers light from the corresponding light beam.

29. The projector according to any of aspects 23 to 28 wherein the optical forms of each of the patch lenses and the corresponding light steering component are calculated independently of each other.

30. The projector according to any of aspects 23 to 28 wherein the optical forms of each of the patch lenses and the corresponding light steering component are calculated together.

31. The projector according to any of aspects 1 to 30 comprising receiving optics upstream from the phase modulator, the receiving optics configured to shape or modify the light beams to better illuminate the phase modulator.

32. The projector according to aspect 31 wherein the receiving optics shape light from the light beams for the light to match a size of the two-dimensional array of pixels.

33. The projector according to any of aspects 1 to 32 wherein the controller is configured to set at least a portion of the pixels of the phase modulator to display phase patterns selected to cause specular reflection of at least a portion of the light beams.
34. The projector according to aspect 33 wherein the controller is configured to dynamically vary the number of pixels in the portion of pixels to adjust a ratio of unsteered light to steered light.
35. The projector according to aspect 34 wherein the controller is configured to determine a desired ratio of unsteered light to steered light based at least in part on processing image data.
36. The projector according to aspect 35 wherein the controller is configured to determine a desired ratio of unsteered light to steered light based at least in part on one or more of: black level of the image data, maximum luminance of highlights in the image data and contrast of the image data.
37. The projector according to any of aspects 1 to 36 further comprising a combining rod downstream from the phase modulator, the combining rod having entrance and exit apertures and light reflecting portions on opposing sides of a central longitudinal axis of the combining rod, the combining rod configured to combine steered and unsteered light and to homogenize the unsteered light by multiple reflections from the reflecting portions before reaching the exit aperture.
38. The projector of aspect 37 wherein the combining rod is a passive optical device.
39. The projector of aspect 37 or 38 wherein the combining rod comprises a hollow tube.
40. The projector of aspect 37 or 38 wherein the combining rod comprises a solid body of transparent material.
41. The projector of aspect 40 wherein the transparent material is at least one of glass, quartz and transparent plastic.
42. The projector of aspect 40 or 41 wherein the solid body comprises a light reflective or light scattering layer or coating.
43. The projector of aspect 37 or 38 wherein the combining rod comprises a hollow rectangular tube having at least one tapered face.
44. The projector of aspect 37 or 38 wherein the combining rod comprises two reflective plane surfaces which taper from the entrance aperture to the exit aperture, the entrance aperture larger than the exit aperture.
45. The projector of aspect 37 or 38 wherein the combining rod is tapered in one plane.
46. The projector of aspect 45 wherein the combining rod is tapered along a horizontal axis of the combining rod.
47. The projector of aspect 45 wherein the combining rod is tapered along a vertical axis of the combining rod.
48. The projector of aspect 37 or 38 wherein the combining rod comprises a twisted rod.
49. The projector of aspect 48 wherein the twisted rod comprises at least one turn of about 90°.
50. The projector of aspect 37 or 38 wherein the combining rod comprises a body having a concave shape.
51. The projector of any of aspects 37 to 50 wherein output angles of light from the exit aperture are about 45° or less.
52. The projector of any of aspects 37 to 51 wherein the combining rod is configured to provide a generally symmetric output.
53. The projector of any of aspects 37 to 52 further comprising a prism optically coupled to the combining rod proximate to the entrance aperture, the prism configured to collect the unsteered light and transmit the unsteered light into the combining rod.
54. The projector of any of aspects 37 to 53 further comprising optical elements to deliver the steered and unsteered light from the phase modulator to the combining rod.
55. The projector of aspect 54 wherein the optical elements comprise a physical lens positioned between the phase modulator and the combining rod.
56. The projector of aspect 55 wherein the physical lens is positioned at a location which maximizes incidence of steered and unsteered light on the physical lens.
57. The projector of any of aspects 37 to 56 further comprising a diffuser in an optical path of the steered light upstream of the combining rod to diffuse the steered light.
58. The projector of any of aspects 37 to 57 further comprising a diffuser in an optical path of the unsteered light upstream of the combining rod.
59. The projector of any of aspects 37 to 58 further comprising a diffuser downstream of the combining rod.
60. The projector of any of aspects 37 to 59 further comprising optics configured to generate base illumination to increase intensity of the steered or unsteered light.
61. The projector of aspect 60 wherein the optics configured to generate base illumination comprise a mirror positioned adjacent the phase modulator.
62. The projector of aspect 61 wherein the mirror is positioned in a plane of the two-dimensional array of pixels of the phase modulator.
63. The projector of aspect 61 or 62 wherein the mirror is parallel to the phase modulator.
64. The projector of any of aspects 61 to 63 wherein the mirror is adjacent to one or more edges of the phase modulator.
65. The projector of aspect 61 wherein the mirror partially covers the two-dimensional array of pixels of the phase modulator.
66. The projector of aspect 60 wherein the optics configured to generate base illumination comprise a prism configured to pull some light out of the light beams to use as base illumination.
67. The projector of any of aspects 37 to 59 further comprising one or more additional light sources configured to generate base illumination to increase intensity of the steered or unsteered light.
68. The projector of any of aspects 1 to 67 comprising a camera configured to capture images of the light steered image and connected to provide the captured images to the controller.
69. The projector of aspect 68 wherein the controller is configured to process the captured images of the light steered images to determine characteristics of light used to generate the light steered images and to vary one or more optical forms of the patch lenses to be displayed by the phase modulator.
70. The projector of any one of aspects 1 to 69 wherein the one or more light sources comprise emitters which emit multi-colour light.

71. The projector of aspect 70 wherein the optical forms of each of the patch lenses is configured at least partially based on a wavelength of the corresponding light beam.
72. The projector of any one of aspects 37 to 69 wherein the one or more light sources comprise emitters which emit multi-colour light, wherein the combining rod homogenizes unsteered light of different wavelengths in one or both of direction of the light and colour of the light.
73. The projector of aspect 72 wherein the optical forms of each of the patch lenses is configured at least partially based on a wavelength of the corresponding light beam.
74. The projector of aspect 72 or 73 further comprising one or more additional light sources of different wavelengths positioned to emit light into the combining rod to increase intensity of the unsteered light.
75. A projection system comprising:
  - a light source operable to emit at least one light beam;
  - a phase modulator comprising a two-dimensional array of pixels, the pixels controllable to retard phase of light incident on the pixels by variable amounts, the phase modulator having an active area in an optical path of the at least one light beam;
  - a controller configured to control the pixels of the phase modulator to apply a pattern of phase shifts to the light of the at least one beam of light, the phase shifts selected to steer the light to generate a highlight image;
  - optical elements arranged to deliver unsteered light that has been specularly reflected by the phase modulator to a combining rod having entrance and exit apertures and light reflecting portions on opposing sides of a central longitudinal axis and to direct the unsteered light into the entrance aperture of the combining rod such that the unsteered light is homogenized by multiple reflections from the light reflecting portions before reaching the exit aperture; and
  - optical elements arranged to deliver the steered light to the combining rod along a path such that the steered light passes from the entrance aperture of the combining rod to the exit aperture of the combining rod without becoming homogenized and is mixed with the homogenized unsteered light at the exit aperture.
76. The projector of aspect 75 wherein the combining rod is a passive optical device.
77. The projector according to aspect 75 or 76 wherein the combining rod is rectangular in cross section.
78. The projector of any of aspects 75 to 77 wherein the combining rod comprises a hollow tube and the steered light passes through a bore of the hollow tubular member.
79. The projector of any of aspects 75 to 77 wherein the combining rod comprises a solid body of transparent material.
80. The projector of aspect 79 wherein the transparent material is at least one of glass, quartz and transparent plastic.
81. The projector of aspect 79 or 80 wherein the solid body comprises a light reflective or light scattering layer or coating.
82. The projector according to any of aspects 75 to 77 wherein the combining rod tapers such that the entrance aperture has a larger area than the exit aperture.
83. The projector of any of aspects 75 to 77 wherein the combining rod comprises a hollow rectangular tube having at least one tapered face.
84. The projector of any of aspects 75 to 77 wherein the combining rod comprises two reflective plane surfaces which taper from the entrance aperture to the exit aperture, the entrance aperture larger than the exit aperture.
85. The projector of any of aspects 75 to 77 wherein the combining rod is tapered in one plane.
86. The projector of aspect 85 wherein the combining rod is tapered along a horizontal axis of the combining rod.
87. The projector of aspect 85 wherein the combining rod is tapered along a vertical axis of the combining rod.
88. The projector of aspect 75 or 76 wherein the combining rod comprises a twisted rod.
89. The projector of aspect 88 wherein the twisted rod comprises at least one turn of about 90°.
90. The projector of aspect 75 or 76 wherein the combining rod comprises a body having a concave shape.
91. The projector of any of aspects 75 to 90 wherein output angles of light from the exit aperture are about 45° or less.
92. The projector of any of aspects 75 to 91 wherein the combining rod is configured to provide a generally symmetric output.
93. The projector of any of aspects 75 to 92 further comprising a prism optically coupled to the combining rod proximate to the entrance aperture, the prism configured to collect the unsteered light and transmit the unsteered light into the combining rod.
94. The projector of any of aspects 75 to 93 further comprising optical elements to deliver the steered and unsteered light from the phase modulator to the combining rod.
95. The projector of aspect 94 wherein the optical elements comprise a physical lens positioned between the phase modulator and the combining rod.
96. The projector of aspect 95 wherein the physical lens is positioned at a location which maximizes incidence of steered and unsteered light on the physical lens.
97. The projector of any of aspects 75 to 96 further comprising a diffuser in an optical path of the steered light upstream of the combining rod to diffuse the steered light.
98. The projector of any of aspects 75 to 97 further comprising a diffuser in an optical path of the unsteered light upstream of the combining rod to diffuse the unsteered light.
99. The projector of any of aspects 75 to 98 further comprising a diffuser downstream of the combining rod to diffuse combined steered and unsteered light.
100. The projector of any of aspects 75 to 99 further comprising optics configured to generate base illumination to increase intensity of the steered or unsteered light.
101. The projector of aspect 100 wherein the optics configured to generate base illumination comprise a mirror positioned adjacent the phase modulator.
102. The projector of aspect 101 wherein the mirror is positioned in a plane of the two-dimensional array of pixels of the phase modulator.
103. The projector of aspect 101 or 102 wherein the mirror is parallel to the phase modulator.
104. The projector of any of aspects 101 to 103 wherein the mirror is adjacent to one or more edges of the phase modulator.

105. The projector of aspect 101 wherein the mirror partially covers the two-dimensional array of pixels of the phase modulator.

106. The projector of aspect 100 wherein the optics configured to generate base illumination comprise a prism configured to pull some light out of the light beams to use as base illumination.

107. The projector of any of aspects 37 to 99 further comprising one or more additional light sources configured to generate base illumination to increase intensity of the steered or unsteered light.

108. A combining rod for combining unsteered light that has been specularly reflected by a phase modulator with steered light which has been phase shifted by the phase modulator, the combining rod comprising:
entrance and exit apertures; and
light reflecting portions on opposing sides of a central longitudinal axis of the combining rod;
wherein unsteered light incident on the reflecting portions is homogenized by multiple reflections from the reflecting portions before reaching the exit aperture.

109. The combining rod of aspect 108 having any of the features of aspects 76 to 92.

110. A method for aligning elements of a projector system, the method comprising:
capturing an image of a generated light pattern;
identifying characteristic features of the light pattern in the captured image;
comparing the identified characteristic features to one or more reference features; and
varying one or more optical forms of displayed patch lenses based on the comparison of the identified characteristic features to the one or more reference features.

111. The method of aspect 110 wherein the characteristic features include at least one of position, shape, intensity and uniformity of individual portions of the light pattern.

112. The method of aspect 110 or 111 wherein varying one or more optical forms of the displayed patch lenses comprises varying at least one of:
focal length of a corresponding patch lens;
location of an optical center of the corresponding patch lens;
lens tilt of the corresponding patch lens;
size of the corresponding patch lens; and
position of a lens area of the corresponding patch lens within a distinct region of a phase modulator.

113. The method of aspect 110 or 111 wherein varying one or more optical forms of the displayed patch lenses comprises:
moving a center of a corresponding patch lens to find a best center location; and
adjusting one or both of lens focal length and size of the corresponding patch lens.

114. The method of aspect 113 wherein varying one or more optical forms of the displayed patch lenses further comprises adjusting a tilt of the corresponding patch lens.

115. The method of any of aspects 110 to 114 wherein the optical forms are varied sequentially.

116. The method of any of aspects 110 to 114 wherein a plurality of the optical forms are varied concurrently.

117. The method of any of aspects 110 to 116 comprising differentiating between parts of the light pattern which originate from different light beams by at least one of:
turning the light beams on one at a time;
turning the light beams off one at a time;
varying intensities of one or more of the light beams in known ways;
changing different beam properties for different ones of the light beams;
applying different light steering components to different ones of the light beams; and
varying optical forms of each patch lens to vary beam patterns at different rates and/or in different directions.

118. A method for powering on a projector system as described in any one of aspects 1 to 107, the method comprising:
retrieving from a data store a plurality of optical forms corresponding to a plurality of patch lenses to be displayed by the phase modulator; and
controlling the phase modulator to display the retrieved optical forms to correct for non-uniformities of light beams incident on the phase modulator.

119. The method of aspect 118 further comprising:
capturing an image of a light pattern generated by the projector system; and
varying one or more of the retrieved optical forms based on a comparison of identified features in the captured image with reference features.

120. A method for projecting an image comprising:
emitting at least one beam of light from a light source;
illuminating an active area of a phase modulator comprising a two-dimensional array of pixels with the at least one beam of light, the pixels controllable to retard phase of light incident on the pixels by variable amounts;
controlling the pixels of the phase modulator to apply a pattern of phase shifts to the light of the at least one beam of light, the phase shifts selected to steer the light to generate a highlight image;
delivering unsteered light that has been specularly reflected by the phase modulator to a combining rod having entrance and exit apertures and light reflecting portions on opposing sides of a central longitudinal axis and directing the unsteered light into the entrance aperture of the combining rod such that the unsteered light is homogenized by multiple reflections from the light reflecting portions before reaching the exit aperture; and
delivering the steered light to the combining rod along a path such that the steered light passes from the entrance aperture of the combining rod to the exit aperture of the combining rod without becoming homogenized and is mixed with the homogenized unsteered light at the exit aperture.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A projection system comprising:
one or more light sources operable to emit a plurality of light beams;
a phase modulator comprising a two-dimensional array of pixels, the pixels controllable to retard phase of light incident on the pixels by variable amounts, the phase modulator having an active area in an optical path of the plurality of light beams, each of the plurality of light beams incident on the active area of the phase modulator in a corresponding one of a plurality of distinct regions of the active area of the phase modulator;

a controller configured to set the pixels of each of the distinct regions of the phase modulator to display an optical form for a patch lens corresponding to the distinct region, the patch lens is configured to correct for non-uniformities present in the plurality of light beams emitted by the one or more light sources.

2. The projector according to claim 1 wherein the controller is configured to set the pixels of each of the distinct regions of the phase modulator to display a light steering phase pattern combined with the optical form for the corresponding patch lens.

3. The projector according to claim 1 wherein the optical form for the patch lens corresponding to the distinct region is at least partially based on measured deviations from ideal of the corresponding light beam.

4. The projector according to claim 1 wherein the optical form for the patch lens corresponding to the distinct region is at least partially based on measured deviations from ideal of a light field produced at an image plane after the corresponding light beam has interacted with the phase modulator.

5. The projector according to claim 1 wherein the corrected non-uniformities comprise at least one of pointing parallelism, collimation and intensity distribution.

6. The projector according to claim 1 wherein adjacent patch lenses abut one another.

7. The projector according to claim 1 wherein an entire active area of the two-dimensional array of pixels of the phase modulator is covered by patch lenses.

8. The projector according to claim 1 wherein the optical form of each patch lens is generated independently.

9. The projector according to claim 1 wherein the optical form of each patch lens is generated by the controller configured to execute an optimization process.

10. The projector according to claim 9 wherein the optimization process comprises iteratively varying phase shifts of the pixels of the corresponding patch lens until one or more observed characteristics of a corresponding output beam indicate that the patch lens is flight steered suitably correcting for deviations from ideal of the light beam.

11. The projector according to claim 1 wherein the optical form for each of the patch lenses specifies at least one of focal length, optical centre shift, parameterized astigmatism and tilt of the corresponding patch lens.

12. The projector according to claim 1 wherein at least one of the distinct regions is divided into a plurality of sub regions and the controller is configured to set the pixels of each of the sub regions to display an optical form corresponding to the sub region.

13. The projector according to claim 1 wherein different parts of a single light beam illuminate two or more sub regions of a corresponding distinct region of the phase modulator.

14. The projector according to claim 1 wherein one or more of the optical forms is respectively varied in real time to account for varying characteristics of a corresponding one of the light beams.

15. The projector according to claim 1 wherein the optical form applied to each of the light beams further comprises a light steering component to steer light.

16. The projector according to claim 15 wherein the light steering components applied to different light beams are different.

17. The projector according to claim 15 wherein the light steering components are configured to steer the light beams to converge at a plurality of different points.

18. The projector according to claim 15 wherein the controller controls each of the distinct regions of the phase modulator individually to display a pattern of phase shifts which steers light from the corresponding light beam.

19. The projector according to claim 15 wherein the optical forms of each of the patch lenses and the corresponding light steering component are calculated independently of each other.

20. The projector according to claim 15 wherein the optical forms of each of the patch lenses and the corresponding light steering component are calculated together.

21. The projector of claim 1 comprising a camera configured to capture images of light steered images and connected to provide the captured images to the controller.

22. The projector of claim 21 wherein the controller is configured to process the captured images of the light steered images to determine characteristics of light used to generate the light steered images and to vary one or more optical forms of the patch lenses to be displayed by the phase modulator.

* * * * *